United States Patent
Gredler

(10) Patent No.: US 9,660,897 B1
(45) Date of Patent: May 23, 2017

(54) BGP LINK-STATE EXTENSIONS FOR SEGMENT ROUTING

(71) Applicant: Juniper Networks, Inc., Sunnyvale, CA (US)

(72) Inventor: Hannes Gredler, Pillberg (AT)

(73) Assignee: Juniper Networks, Inc., Sunnyvale, CA (US)

( * ) Notice: Subject to any disclaimer, the term of this patent is extended or adjusted under 35 U.S.C. 154(b) by 458 days.

(21) Appl. No.: 14/230,946

(22) Filed: Mar. 31, 2014

Related U.S. Application Data

(60) Provisional application No. 61/911,927, filed on Dec. 4, 2013.

(51) Int. Cl.
*H04L 12/715* (2013.01)
*H04L 12/723* (2013.01)

(52) U.S. Cl.
CPC .............. *H04L 45/04* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 7,046,565 B1 * | 5/2006 | Barth, Jr. ............... | G11C 7/065 365/203 |
| 7,184,437 B1 | 2/2007 | Cole et al. | |
| 7,466,703 B1 * | 12/2008 | Arunachalam ......... | H04L 45/00 370/351 |
| 7,864,706 B1 * | 1/2011 | Zinjuwadia ............. | H04L 45/02 370/252 |
| 8,050,559 B2 | 11/2011 | Sindhu | |
| 8,804,494 B1 * | 8/2014 | Uberoy ............... | H04L 41/0663 370/219 |
| 8,817,596 B2 | 8/2014 | Chen et al. | |

(Continued)

FOREIGN PATENT DOCUMENTS

WO 2013184846 A1 12/2013

OTHER PUBLICATIONS

Gredler et al. "Advertising Traffic Engineering Information in BGP" draft-gredler-bgp-te-00, Inter-Domain Routing, Internet-Draft, Mar. 3, 2011, 19 pgs.

(Continued)

*Primary Examiner* — Ninos Donabed
(74) *Attorney, Agent, or Firm* — Shumaker & Sieffert, P.A.

(57) ABSTRACT

Mechanisms are described by which link state "path" information can be collected from networks and shared with external components, such as routers or centralized controllers or path computation elements, using an exterior gateway protocol, such as the Border Gateway Protocol. That is, the link state information for multiple interior gateway protocol (IGP) routing domains is shared between external components using the exterior gateway protocol, such as BGP. As such, the techniques described herein allow link state information to be shared across different routing domains, such as routing and reachability information shared between different autonomous systems. The extensions described herein allow an exterior gateway protocol to be used to signal explicit path segments within IPG routing domains so as to set up an overall path that spans the multiple IPG routing domains.

20 Claims, 19 Drawing Sheets

(56) References Cited

U.S. PATENT DOCUMENTS

| | | | |
|---|---|---|---|
| 9,019,865 B2* | 4/2015 | Gredler | H04L 45/04 370/254 |
| 9,049,098 B2* | 6/2015 | Guichard | H04L 45/02 |
| 9,166,990 B2* | 10/2015 | Eswaran | H04L 45/04 |
| 9,253,084 B2 | 2/2016 | Esale | |
| 9,350,654 B1 | 5/2016 | Gredler et al. | |
| 2002/0004843 A1 | 1/2002 | Anderson et al. | |
| 2004/0039840 A1* | 2/2004 | Dispensa | H04L 45/02 709/242 |
| 2005/0131912 A1* | 6/2005 | Lin | H04L 45/02 |
| 2006/0056328 A1* | 3/2006 | Lehane | H04L 45/02 370/315 |
| 2006/0087965 A1 | 4/2006 | Shand et al. | |
| 2006/0159076 A1* | 7/2006 | Bless | F03B 17/04 370/356 |
| 2006/0242690 A1* | 10/2006 | Wolf | H04L 41/0213 726/6 |
| 2007/0177523 A1 | 8/2007 | Nagami et al. | |
| 2007/0183317 A1 | 8/2007 | Vasseur et al. | |
| 2007/0208874 A1* | 9/2007 | Previdi | H04L 67/1008 709/238 |
| 2007/0253416 A1 | 11/2007 | Raj | |
| 2008/0044181 A1 | 2/2008 | Sindhu | |
| 2008/0049751 A1* | 2/2008 | Venkat | H04L 45/02 370/392 |
| 2009/0073996 A1* | 3/2009 | Swallow | H04L 45/04 370/401 |
| 2009/0185484 A1* | 7/2009 | Bless | F03B 17/04 370/225 |
| 2009/0252173 A1 | 10/2009 | Sampath et al. | |
| 2010/0212005 A1* | 8/2010 | Eswaran | H04L 45/04 726/13 |
| 2010/0271936 A1 | 10/2010 | Allan et al. | |
| 2011/0019534 A1 | 1/2011 | Ramakrishnan et al. | |
| 2011/0235545 A1* | 9/2011 | Subramanian | H04L 45/04 370/254 |
| 2012/0020364 A1* | 1/2012 | Zinjuwadia | H04L 45/02 370/401 |
| 2012/0033542 A1 | 2/2012 | Hanif et al. | |
| 2012/0033663 A1* | 2/2012 | Guichard | H04L 45/02 370/389 |
| 2012/0224506 A1* | 9/2012 | Gredler | H04L 45/04 370/254 |
| 2012/0239796 A1* | 9/2012 | Narasappa | H04L 45/02 709/224 |
| 2012/0287935 A1* | 11/2012 | Swallow | H04L 45/04 370/392 |
| 2013/0089100 A1 | 4/2013 | Zhao et al. | |
| 2013/0121339 A1* | 5/2013 | Dispensa | H04L 12/1868 370/401 |
| 2013/0336191 A1 | 12/2013 | Zhao et al. | |
| 2014/0098675 A1* | 4/2014 | Frost | H04L 69/166 370/241.1 |
| 2014/0126420 A1 | 5/2014 | Chiabaut et al. | |
| 2014/0149782 A1* | 5/2014 | Lu | H04L 45/021 714/4.2 |
| 2014/0149819 A1* | 5/2014 | Lu | H04L 45/021 714/748 |
| 2015/0131458 A1* | 5/2015 | Scharf | H04L 45/123 370/252 |

OTHER PUBLICATIONS

Gredler et al. "North-Bound Distribution of Link-State and TE Information using BGP" draft-ietf-idr-ls-distribution-03, Inter-Domain Routing, Internet-Draft, May 21, 2013, 44 pgs.

Filsfils et al. "Segment Routing Architecture" draft-filsfils-rtgwg-segment-routing-00, Network Working Group, Internet-Draft, Jun. 28, 2013, 29 pgs.

Rekhter et al. A Border Gateway Protocol 4 (BGP-4) Network Working Group, RFC 4271, Jan. 2006, 94 pgs.

"Information Technology—Telecommunications and Information Exchange between Systems—Intermediate System to Intermediate System intra-domain routeing information exchange protocol for use in conjunction with the protocol for providing the connectionless-mode network service (ISO 8473)," ISO, ISO/IEC 10589:2002, Second Edition, Nov. 15, 2002, 210 pgs.

Aggarwal, et al., "MPLS Upstream Label Assignment and Context-Specific Label Space," IETF Trust, Aug. 2008, 14 pp.

Anderson, "LDP Specification," Network Working Group, RFC 3036, Jan. 2001, 132 pp.

Anderson, "LDP Specification," Network Working Group, RFC 5036, Oct. 2007, 135 pp.

Asati, et al., "Label Distribution Protocal (LDP) 'Typed Wildcard' Forward Equivalence Class (FEC)," IETF Trust, Aug. 2010, 11 pp.

Atlas et al., "Basic Specification for IP Fast Reroute: Loo-Free Alternates," IETF Trust, Sep. 2008, 32 pp.

Bryant et al., "IP Fast Reroute using tunnels draft-bryant-ipfrr-tunnels-03," IETF Trust, Nov. 16, 2007, 30 pp.

Bryant et al., "Remote LFA FRR draft-ietf-rtgwg-remote-lfa-01," IETF Trust, Dec. 19, 2012, 14 pp.

Filsfils et al., "Segment Routing with MPLS data plane," draft-filsfils-spring-segment-routing-mpls-03, Network Working Group, Internet Draft, Jul. 31, 2014, 13 pp.

Gredler, "Advertising MPLS labels in IGPs draft-gredler-rtgwg-igp-label-advertisement-00," IETF Trust, Inc., Mar. 3, 2011, 19 pp.

Moy, "OSPF Version 2," Network Working Group, RFC 2328, Apr. 1998, 204 pp.

Previdi, et al., "SPRING Problem Statement and Requirements," draft-ietf-spring-problem-statement-01, Network Working Group, Internet Draft, Jun. 26, 2014, 15 pp.

Rosen et al., "Multiprotocol Label Switching Architecture," Network Group, RFC 3031, Jan. 2001, 6 pp.

Thomas et al., "LDP Capabilities," IETF Trust, Jul. 2009, 13 pp.

U.S. Appl. No. 61/765,515, by Hannes Gredler, filed Feb. 15, 2013.

* cited by examiner

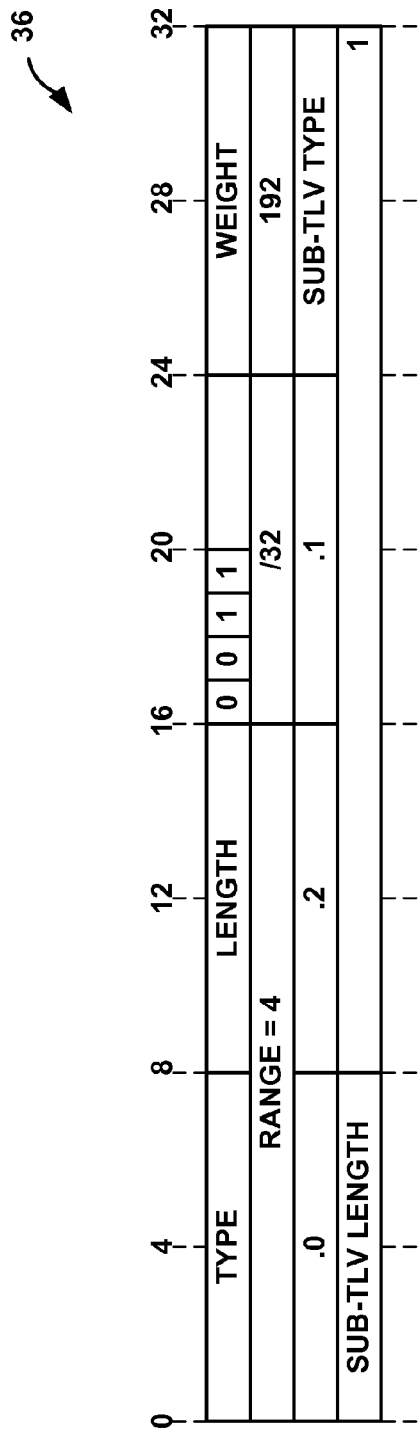
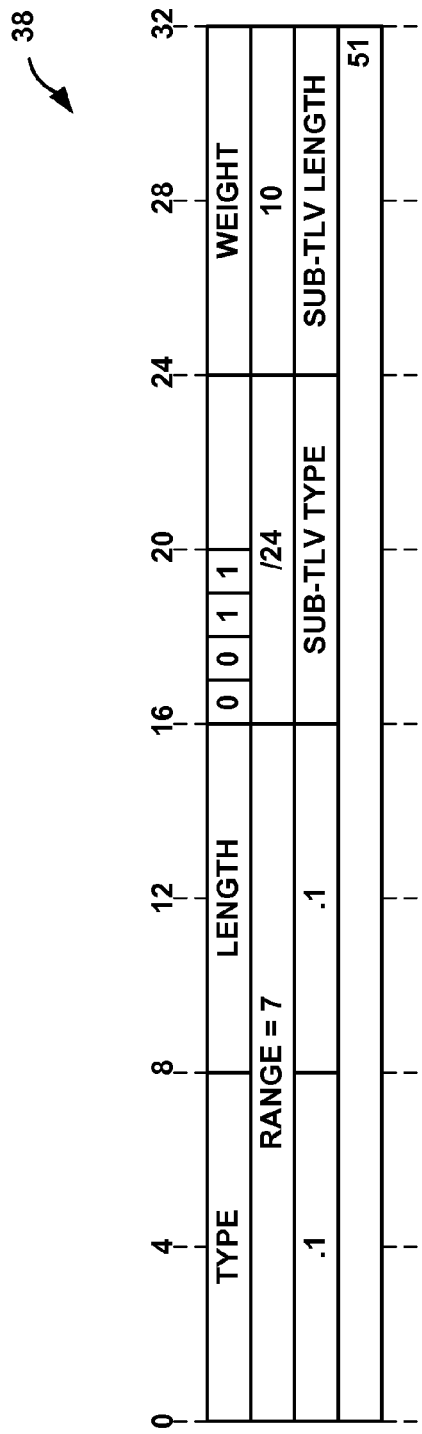
FIG. 7A
FIG. 7B

BGP LINK-STATE EXTENSIONS FOR SEGMENT ROUTING

This application claims the benefit of U.S. Patent Application 61/911,927, filed Dec. 4, 2013, the entire content of which is incorporated herein by reference.

TECHNICAL FIELD

The invention relates to computer networks and, more particular, to routing protocols used within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area. The contents of a Link State Database (LSDB) or a Traffic Engineering Database (TED) maintained in accordance with a link state routing protocol only have the scope of an IGP area. IPG routing protocols typically require that all routers in the IGP routing domain store within an internal LSDB or TED all of the routing information that has been distributed according to the IGP protocol. In this way, the routers are able to select paths that are consistent and loop-free. Further, the ubiquity of the routing information allows the flooding process to be reliable, efficient and guaranteed to terminate. In operation, each router typically maintains an internal link state database and scans the entire database at a defined interval to generate and output link state messages so as to synchronize the database to neighboring routers within the routing domain. In this way, link state is propagated across the entire routing domain and stored in full at each router within the domain.

Open Shortest Path First (OSPF) and Intermediate system to intermediate system (IS-IS) are example link state protocols that use link state messages to ensure their routing topology is synchronized with respect to available interfaces, metrics and other variables associated with network links OSPF utilizes Link State Advertisements (LSAs) while IS-IS uses Link State Protocol Data Units (LSPs) to exchange information. In network topologies where routers are connected by point-to-point connections, each router floods link state messages to adjacent routers reachable on each interface to ensure synchronization. In networks using multi-access media, such as an Ethernet network, the routers within the network flood the link state messages to all other routers. In either case, the receiving routers construct and maintain their own network topologies using the link information received via the link state messages. IS-IS is specified in "Intermediate system to Intermediate system routing information exchange protocol for use in conjunction with the Protocol for providing the Connectionless-mode Network Service (ISO 8473)," ISO, ISO/IEC 10589:2002, the entire contents of which is incorporated herein by reference.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol (RSVP) with Traffic Engineering extensions (RSVP-TE), label switching routers can forward traffic along a particular path through a network to a destination device, i.e., a Label Switched Path (LSP), using labels prepended to the traffic. An LSP defines a distinct path through the network to carry MPLS packets from the source device to a destination. Using a MPLS protocol, each router along an LSP allocates a label in association with the destination and propagates the label to the closest upstream router along the path. Routers along the path add or remote the labels and perform other MPLS operations to forward the MPLS packets along the established path.

MPLS with traffic engineering (MPLS-TE) applies constraint based routing to costs and resource availability for network links within a routing domain to select LSP paths within the routing domain. In conventional network environments, a router or path computation element (PCE) external to one or more IGP routing domains is typically unable to compute a MPLS-TE path across and through multiple IGP areas because the device's own IGP Traffic Engineering Database (TED) lacks visibility of the complete topology, i.e., the costs and resource availability for the individual links within each of the IGP routing domains. As a result, the router is typically unable to determine a complete end-to-end path, and is often unable to even select optimal exit routers for each routing domain so as to create an optimal path. This may be problematic for large-scale networks that need to segment their core networks into distinct routing areas, but which still want to take advantage of MPLS-TE.

Previous solutions used per-domain path computation in which a respective router or PCE associated with each IGP routing domain computed the internal path for the corresponding routing domain. In such implementations, the source router could only compute the path for the first area because the router only has full topological visibility (e.g., link state, costs and utilization) within the first area along the path, but not for subsequent areas. Per-domain path computation uses, for example, a technique called "loose-hop-expansion", and selects the exit ABR and other ABRs or AS Border Routers (ASBRs) using the IGP computed shortest path topology for the remainder of the path. This may lead to sub-optimal paths, makes alternate/back-up path computation hard, and might result in no TE path being found even in situations where one actually exists.

SUMMARY

In general, this disclosure describes mechanisms by which link state "path" information can be collected from networks and shared with external components, such as routers or centralized controllers or path computation elements, using an exterior gateway protocol, such as the Border Gateway Protocol. That is, the link state path information is shared between external components using BGP rather than a link state protocol, such as OSPF or IS-IS, which is designed to be used within a given routing area. As such, the techniques described herein allow link state path information from within a routing domain, e.g., within an IGP routing domain, to be shared across different routing domains, such as by sharing the intra-domain link state information as routing and reachability information shared between different autonomous systems.

Furthermore, mechanisms are described herein that allow external components to request network path creation by using stacked segments. This may be achieved, for example, by extending the BGP Network Layer Reachability Information (NLRI) encoding format.

For example, in one implementation protocol extensions for the BGP Link state Protocol Address Family are described. The mechanisms add the same path description properties as its IGP counterparts. Furthermore this documents describes the ability to describe both existing paths (northbound) as well as 'to be created' paths (southbound) in a network, which makes it a SDN suitable, point-to-multipoint (p2mp) path creation protocol.

The techniques may provide certain advantages. For example, extensions described herein for some applications, such as end-to-end Traffic Engineering (TE), may benefit from visibility outside one area or Autonomous System (AS) in order to make better path decisions.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7A illustrates a first example resultant encoding for the SID/Label Binding TLV of FIGS. 6A, 6B for a first set of router addresses.

FIG. 7B illustrates a second example resultant encoding for the SID/Label Binding TLV a second set of router addresses.

DETAILED DESCRIPTION

Figure 1:
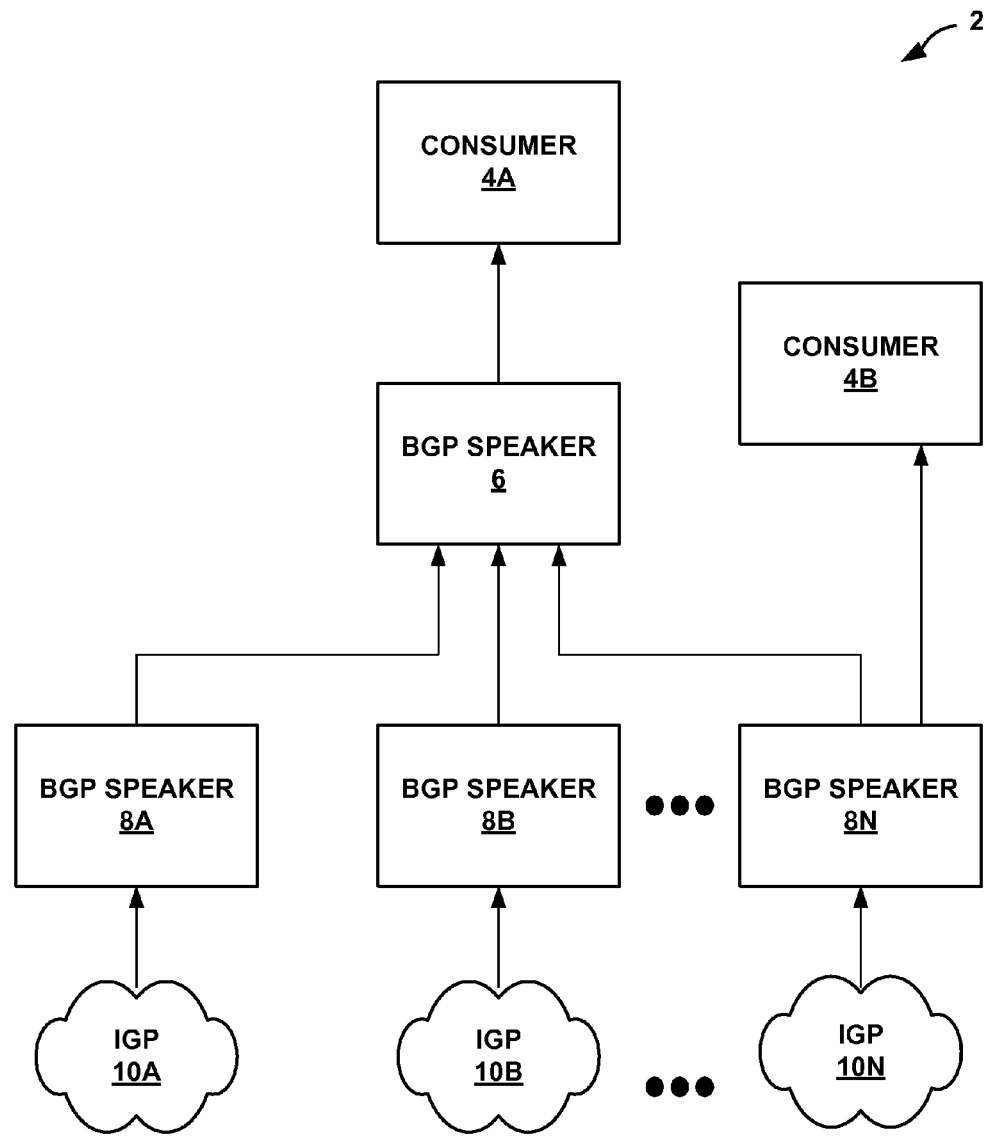
FIG. 1 is a block diagram illustrating an example network in which routers associated with respective interior gateway protocol (IGP) routing domains collect link state information from the corresponding IGP routing domains and communicate the information to one or more external consumers.

This disclosure describes techniques by which link state path information for an interior routing domain can be collected and shared with external components. Furthermore, mechanisms are described that allow external components to request network path creation within one or more routing domains by using stacked network "segments" within those domains.

In general, Segment routing (SR) within an IGP domain allows routers to advertisement single or multi-hop label switched paths LSPs within the IGP domain. For segment routing, the "path" information is disseminated between the routers as part of the IGP link state information for the domain. Routers are able to steer packets through a controlled set of segments defining a path by prepending an SR header to the packets. Segment routing allows routers to enforce a flow through any topological path and service chain while maintaining per-flow state only at the ingress node to the SR domain.

One advantage of segment routing is that the segment routing architecture can be directly applied to the MPLS data plane with no change in the forwarding plane. A network operator need only allocate one node segment per router and the SR IGP control-plane automatically builds the required MPLS forwarding constructs from any router to any other router.

This document describes protocol extensions for an exterior routing protocol (BGP in this example) by which a specialized link state address family is extended to path information as part of any link state information carried by the exterior routing protocol. In one example, a BGP link state protocol address family is extended to add path description properties for describing IGP paths. Furthermore, this document describes features by which routers can describe within BGP any existing paths within an IGP domain as well as features by which IGP paths can be created using BGP.

In general, a network router utilizing a link-state routing protocol within a routing domain (e.g., an IGP routing domain) typically maintains one or more link state databases (LSDBs) for storing link-state information about nodes, links and paths within a given area referred to as the routing domain. Attributes of a "path" stored in these TE databases for an IGP domain typically include: headend/tailend IP addresses for the path, a list of explicit rout objects (EROs), a backup ERO list, a list of supported hop-by-hop algorithms, and hop-by-hop label ranges. Segment Routing utilizes this information within an IGP domain to advertise path information as part of the link-state IGP information that is flooded throughout the IGP domain so as to support path-based packet steering. Segment Routing is described in Filsfils et. al, "Segment Routing Architecture", Internet-Draft draft-filsfils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013, the entire contents of each being incorporated herein by reference.

As described herein, an exterior gateway routing protocol executing on a router (e.g., a BGP process) can retrieve the path information as part of the link state information retrieved from link state databases of an interior routing domain and distribute the path information to a consumer external to the routing domain, either directly or via a peer BGP Speaker (e.g., a dedicated Route Reflector), using the encoding specified in this document. That is, mechanisms are described herein by which link state "path" information can be collected from one or more networks, e.g., via an IGP protocol, and shared with external components, such as other routers, centralized controllers or path computation elements, using extensions described herein for an exterior gateway protocol, such as the Border Gateway Protocol. The BGP routing protocol Rekhter, Y., Li, T. and S. Hares, "A Border Gateway Protocol 4 (BGP-4)", RFC 4271, January 2006, the entire contents of which are incorporated herein by reference.

FIG. 1 is a block diagram an example network 2 in which BGP speakers 6, 8A-8N collect link state MPLS path information from a plurality of separate IGP routing domains 10A-10N and distribute the information to one or more consumers 4A-4B. For example, each of BGP speakers 8 may be routers associated with a respective interior gateway protocol (IGP) routing domain. As such, each of BGP speakers 8 may implement a link state routing protocol (e.g., IS-IS or OSPF) for communicating with other peer routers within respective IGP routing domains 10A-10N. For example, BGP speaker 8A may execute a link-state protocol to share link state information for IGP routing domain 10A with other routers within the IGP routing domain 10A. Each BGP speaker 8 typically internally maintains one or more link state databases (LSDBs) for storing link-state information about nodes, links and paths within the respective routing domain 10.

In accordance with the techniques described herein, each BGP speaker 8 may execute an exterior routing protocol (e.g., the Border Gateway Protocol) to encode the link state information and communicate the link state information consumers 4A, 4B external to IGP routing domains 10. In this example, BGP speaker 6 aggregates link state information learned from BGP speakers and communicates the link state information using BGP to consumer 4A. BGP speaker 6 may, for example, be a router or route reflector that communicates routing information via the BGP protocol.

Figure 2:
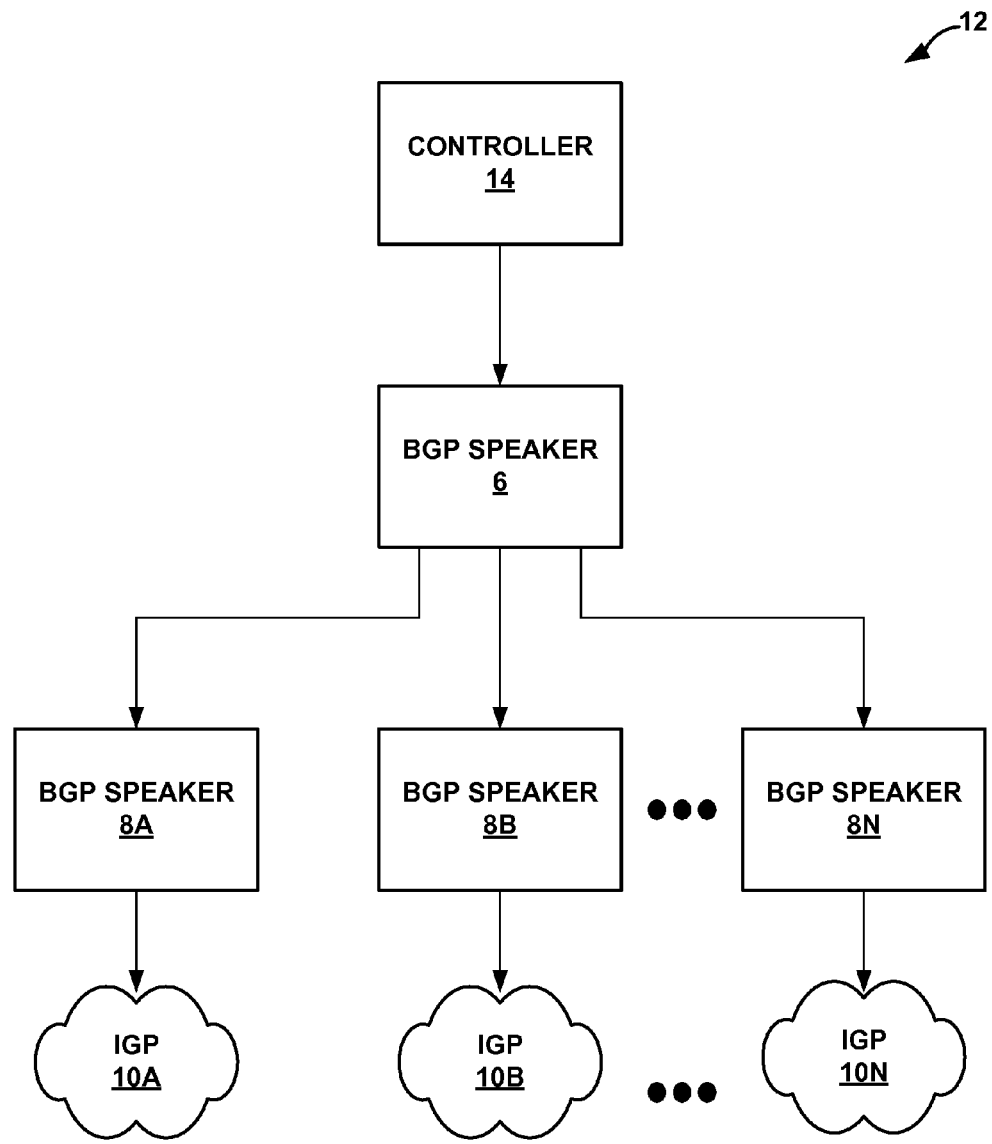
FIG. 2 is a block diagram illustrating an example network in which a centralized controller generates path information for distribution and configuration of paths within IGP routing domains.

FIG. 2 is a block diagram network 12 in which a centralized controller 14 generates Link State MPLS path information for distribution to BGP speakers 6, 8A-8B for configuring paths within IGP areas 14. In FIG. 2, controller 14 is illustrated separately from consumer 4A (FIG. 1) for purposes of example and may operate within the same external component as consumer 4A. In other words, controller 14 may operate as consumer 4A to receive IGP link state information for IGP routing domains 10, and may operate to generate path information for configuring paths within IGP routing domains and may communicate the link-state path information to BGP speakers 8 by encoding the IGP link state information within BGP or other exterior routing protocols in accordance with the techniques described herein.

As one example, controller 14 may be a software defined network (SDN) controller, a path computation element (PCE), policy server or other device. Further example details of an SDN controller are described in PCT International Patent Application PCT/US13/44378, filed Jun. 5, 2013, the contents of which are incorporated herein by reference.

One example implementation for the techniques described herein is networks in which multiprotocol label switching (MPLS)-TE is used in conjunction with a centralized controller 14 that computes end-to-end paths through one or more IGP areas 10. In such an environment, controller 14 may be a PCE that computes MPLS-TE paths within, i.e., internal to, a routing domain (such as within one of IGP areas 10) or across and through multiple routing domains (such as a through multiple IGP domains 10, multi-area AS, or multiple ASes).

In such environments, controller 14 represents a PCE, SDN controller, router or other device that, as described herein, has visibility into the traffic engineering information for links within more than one IGP area 10. In some cases, controller 14 may cooperate with other PCEs to perform distributed path computation. Moreover, routers associated with each of the individual IGP domains (e.g., BGP speakers 8) may utilize the techniques described herein to provide controller 14 accesses to the IGP TED for the respective IGP routing domain the router serves.

Figure 3:
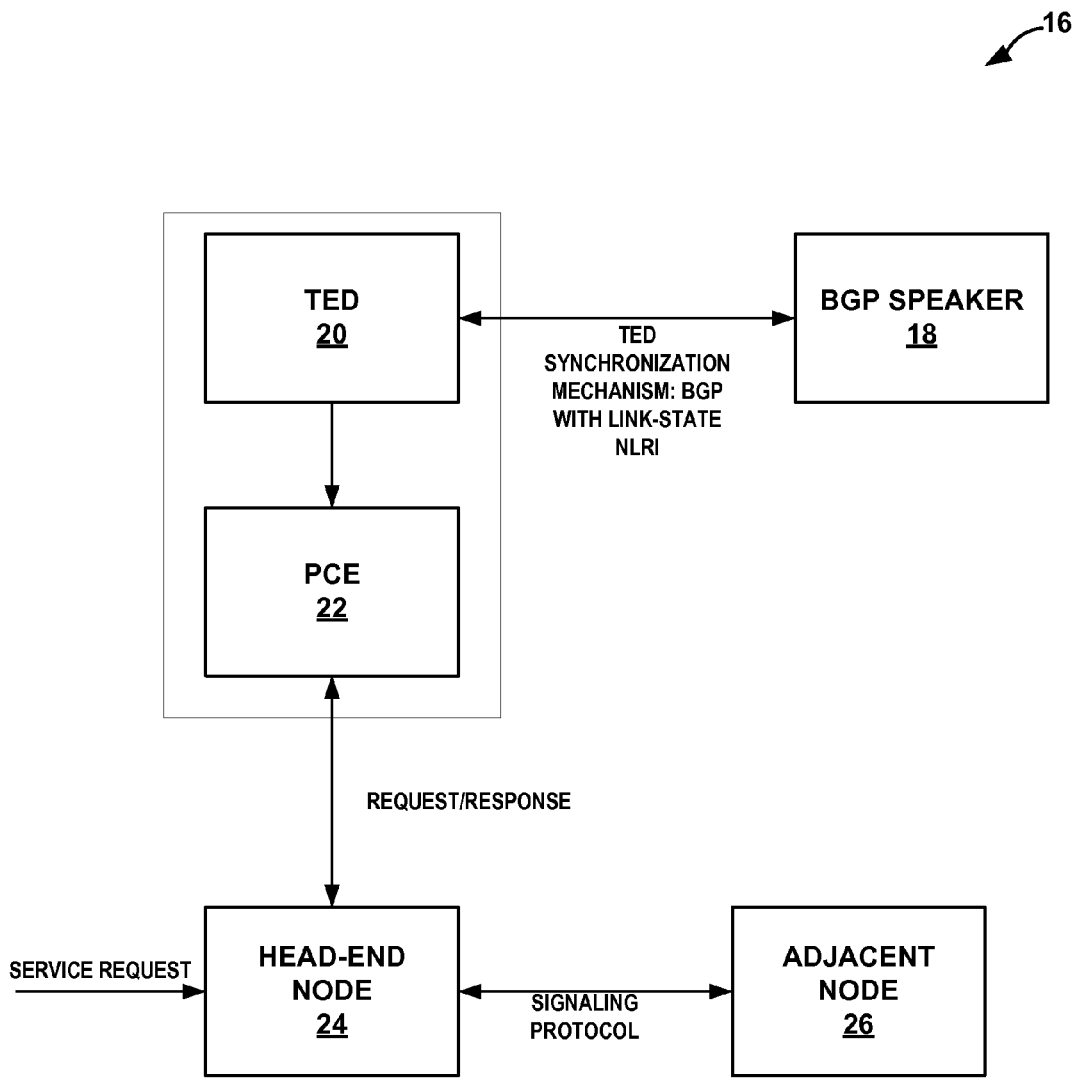
FIG. 3 is a block diagram illustrating an example portion of a network in which PCE obtains and maintains TED information using the mechanism described in this document.

FIG. 3 is a block diagram illustrating an example portion of a network 16 in which PCE 22 obtains and maintains TED information 20 using the mechanism described in this document. In this example, PCE 22 and BGP speaker 18 may represent controller 14 and BGP speaker 6, respectively, of FIG. 2.

As shown in FIG. 3, the mechanisms described herein allow the necessary TED information 20 to be collected for one or more IGP routing domains within a network by way of BGP speaker(s) 18, filtered according to configurable policies, and distributed to PCE 22 as necessary. Furthermore, PCE 22 can compute and distribute paths by using a BGP distribution mesh. For example, in response to a service request for a path to a destination, head-end node 24 may request path information from PCE 22 which, based on the link state information received from BGP speakers 18, may direct head-end node 24 to signal a path along one or more adjacent nodes 26.

This document describes techniques by which an exterior routing protocol typically used for communication between two routers associated with different routing domains can be extended to carry link state traffic engineering (TE) typically only available within a given link state routing domain. For example, in one example implementation, this document provides a definition for a new BGP network Layer Reachability Information (NLRI) encoding format that can be used to describe links, nodes and prefixes comprising IGP link state information typically known only internally to an IGP routing domain. In addition, this document provides a definition of a new BGP path attribute (BGP-LS attribute) that can be used to communicate link, node and prefix properties and attributes, such as the link and prefix metric or auxiliary identifiers of routers, and the like.

Figure 4:
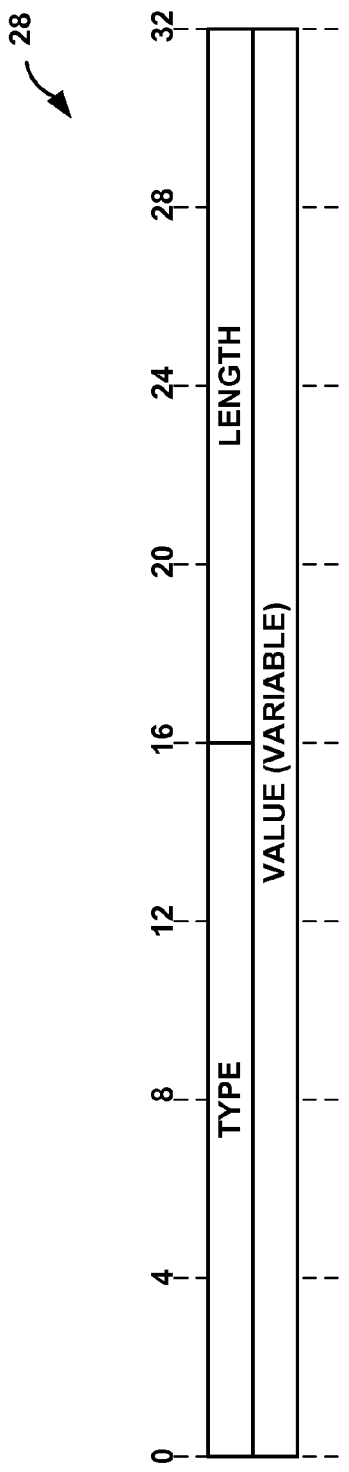
FIG. 4 illustrates an example Type/Length/Value (TLV) format that is used to extend BGP and allow signaling of encoding explicit paths across inter-domain boundaries.

FIG. 4 illustrates one example Type/Length/Value (TLV) format 28 that is used to extend BGP and allow signaling of encoding explicit paths across inter-domain boundaries. As further described below, information in the example new Link-State NLRIs and attributes is encoded in Type/Length/Value triplets. In this way, TLV format 28 encodes IGP link state routing information within a BGP exterior routing protocol.

In this example, the Length field defines the length of the value portion in octets. Thus, a TLV with no value portion would have a length of zero. The TLV is not padded to four-octet alignment. Unrecognized types are preserved and propagated. In order to compare NLRIs with unknown TLVs, all TLVs are ordered in ascending order. If there are more TLVs of the same type, then the TLVs are ordered in ascending order of the TLV value within the set of TLVs with the same type.

Segment Routing Identifiers Encoding as a New BGP Link State (LS) Attribute

In general, segment routing within an IGP domain applies a routing architecture that utilizes defined types of Segment Identifiers (SID). This document defines techniques by which certain segment identifiers, i.e., the IGP-Prefix-SID, the IGP-Adjacency-SID, the IGP-LAN-Adjacency-SID and the Binding-SID, can be encoded within an exterior routing protocol for communication with one or more external devices. For example, this documents describes the link state encodings for the BGP protocol.

SID/Label Sub-TLV

Figure 5:
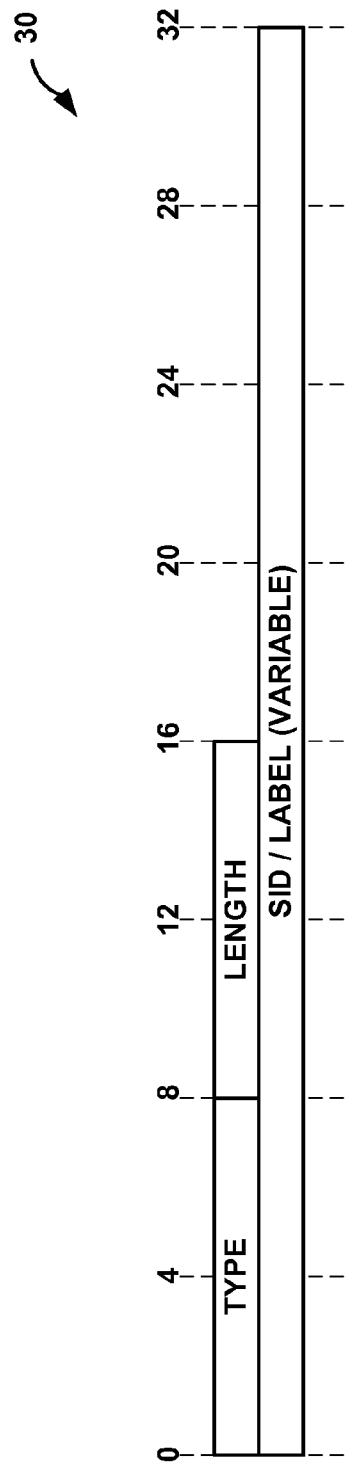
FIG. 5 illustrates a Segment Identifier (SID)/Label Sub-TLV that is present in multiple Sub-TLVs defined in this document and is used to convey a SID or an MPLS Label.

FIG. 5 illustrates a SID/Label Sub-TLV 30 that is present in multiple Sub-TLVs defined in this document and contains a SID or an MPLS Label. In one example, the SID/Label Sub-TLV has the format shown in FIG. 5, where:
 Type: 1
 Length: variable (3 or 4)
 SID/Label: if length is set to 3 then the 20 rightmost bits represent a MPLS label. If length is 4 then the value represents a 32 bits SID.

Node Attribute TLVs

Node attribute TLVs are the TLVs that may be encoded in the BGP-LS attribute with a node NLRI. Each 'Node Attribute' is a Type/Length/Value (TLV) triplet formatted as defined above.

In one example, the following 'Node Attribute' TLVs are valid in the BGP LINK_STATE attribute:

TABLE 1

| TLV CODE POINT | DESCRIPTION | LENGTH |
| --- | --- | --- |
| 1030 | SID/LABEL BINDING | VARIABLE |
| 1031 | SR CAPABILITIES | VARIABLE |
| 1032 | SR ALGORITHM | VARIABLE |

SID/Label Binding TLV

The SID/Label Binding TLV may be originated by any router in an SR domain. The router may advertise a SID/Label binding to a FEC along with at least a single 'nexthop style' anchor. The protocol supports more than one 'nexthop style' anchor to be attached to a SID/Label binding, which results into a simple path description language. In this way, the SID/Label binding allows for an exterior gateway protocol to essentially be used to signal 'Explicit Route Object' (ERO) within IPG routing domains so as to set up explicit paths that span multiple IPG routing domains. Since ERO style path notation allows SID/label bindings to be anchored to both link and node IP addresses, any label switched path can be described. Furthermore also SID/Label Bindings from external protocols can get easily re-advertised.

The SID/Label Binding TLV may be used for advertising SID/Label Bindings and their associated Primary and Backup paths. In one single TLV either a primary ERO Path, a backup ERO Path or both can be advertised. If a router wants to advertise multiple parallel paths then the router can generate several TLVs for the same Prefix/FEC. Each occurrence of a Binding TLV with respect with a given FEC Prefix has accumulating and not canceling semantics.

Figure 6A:
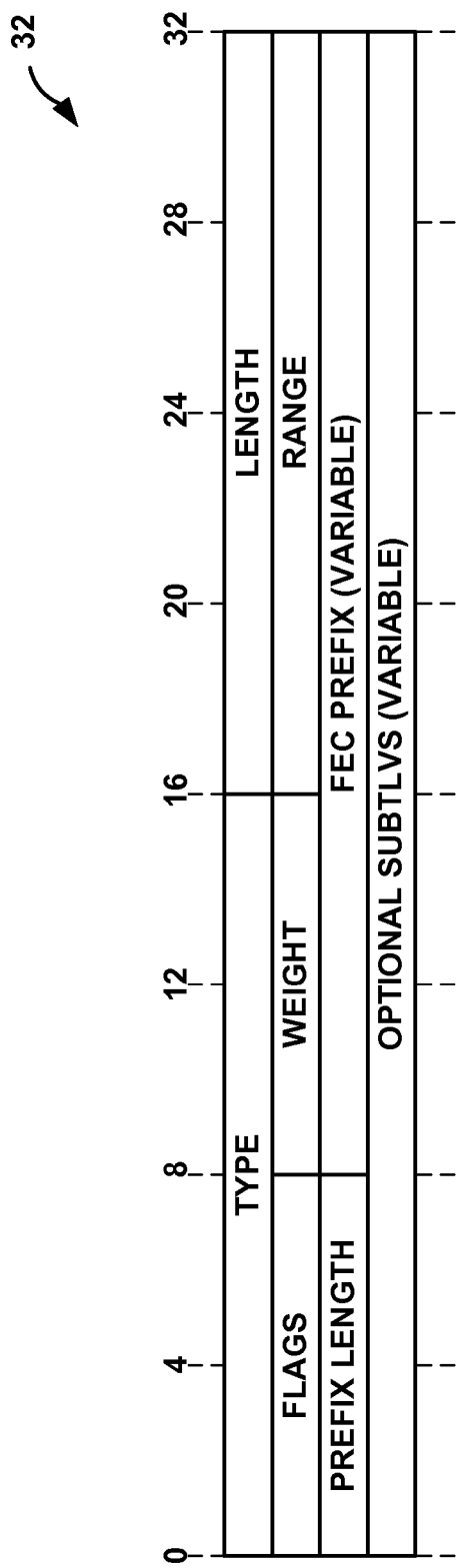
FIGS. 6A, 6B illustrates an example SID/Label Binding TLV for advertising SIDs or label bindings and for a primary and a backup path.
Figure 6B:
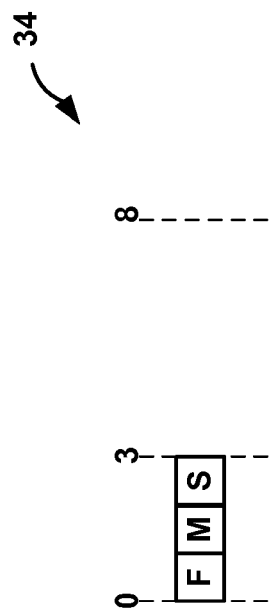

FIG. 6A illustrates an example SID/Label Binding TLV 32, where:
 Type: 1032,
 Length: variable,
 Flags: 1 octet,
 Weight: 1 octet: The value represents the weight of the path for the purpose of load
 balancing,
 Range: 2 octets,
 Prefix length: 1 octet,
 FEC Prefix: 0-16 octets,
 sub-TLVs, where each sub-TLV consists of a sequence of:
  1 octet of sub-TLV type
  1 octet of length of the value field of the sub-TLV
  0-255 octets of value
 FIG. 6B shows an example octet field 34 of flags:
 F-Flag: Address Family flag. If unset, then the Prefix FEC carries an IPv4 Prefix. If set then the Prefix FEC carries an IPv6 Prefix.
 M-Flag: Mirror Context flag. Set if the advertised SID/path corresponds to a mirrored context.
 S-Flag: subTLV present 'S' flag: Set if there are subTLVs present.
 Other bits: should be zero when originated and ignored when received.

The 'Range' field provides the ability to specify a range of addresses and their associated Prefix SIDs. It is essentially a compression scheme to distribute a continuous Prefix and their continuous, corresponding SID/Label Block. If a single SID is advertised then the range field is set to one. For range advertisements >1, the number of addresses that need to be mapped into a Prefix-SID and the starting value of the Prefix-SID range.

FIG. 7A illustrates an example resultant encoding 36 in a first example in which the following router addresses (loopback addresses) need to be mapped into the corresponding Prefix SID indexes:

Router-A: 192.0.2.1/32, Prefix-SID: Index 1
Router-B: 192.0.2.2/32, Prefix-SID: Index 2
Router-C: 192.0.2.3/32, Prefix-SID: Index 3
Router-D: 192.0.2.4/32, Prefix-SID: Index 4

FIG. 7B illustrates an example resultant encoding 38 in a second example in which the following prefixes need to be mapped into the corresponding Prefix-SID indexes:
10.1.1/24, Prefix-SID: Index 51
10.1.2/24, Prefix-SID: Index 52
10.1.3/24, Prefix-SID: Index 53
10.1.4/24, Prefix-SID: Index 54
10.1.5/24, Prefix-SID: Index 55
10.1.6/24, Prefix-SID: Index 56
10.1.7/24, Prefix-SID: Index 57

It is not expected that a network operator will be able to keep fully-continuous FEC Prefix/SID/Index mappings. In order to support non-continuous mapping ranges an implementation may generate several instances of Binding TLVs.

For example if a router wants to advertise the following ranges:
Range 16: {192.168.1.1-15, Index 1-15}
Range 6: {192.168.1.22-27, Index 22-27}
Range 41: {192.168.1.44-84, Index 80-120}

In this example, a router would advertise three instances of the Binding TLV.

The 'FEC Prefix' field represents the Forwarding equivalence class at the tail-end of the advertised path. The 'FEC Prefix' field does not need to correspond to a routable prefix of the originating node.

The 'Prefix Length' field contains the length of the prefix in bits. Only the most significant octets of the Prefix FEC are encoded. I.e. 1 octet for FEC prefix length 1 up to 8, 2 octets for FEC prefix length 9 to 16, 3 octets for FEC prefix length 17 up to 24 and 4 octets for FEC prefix length 25 up to 32, . . . , 16 octets for FEC prefix length 113 up to 128.

SID/Label Sub-TLV

The SID/Label Sub-TLV (Type 1) contains the SID/Label value. A SID/Label value is present in each SID/Label Binding TLV.

ERO Metric Sub-TLV

Figure 8:
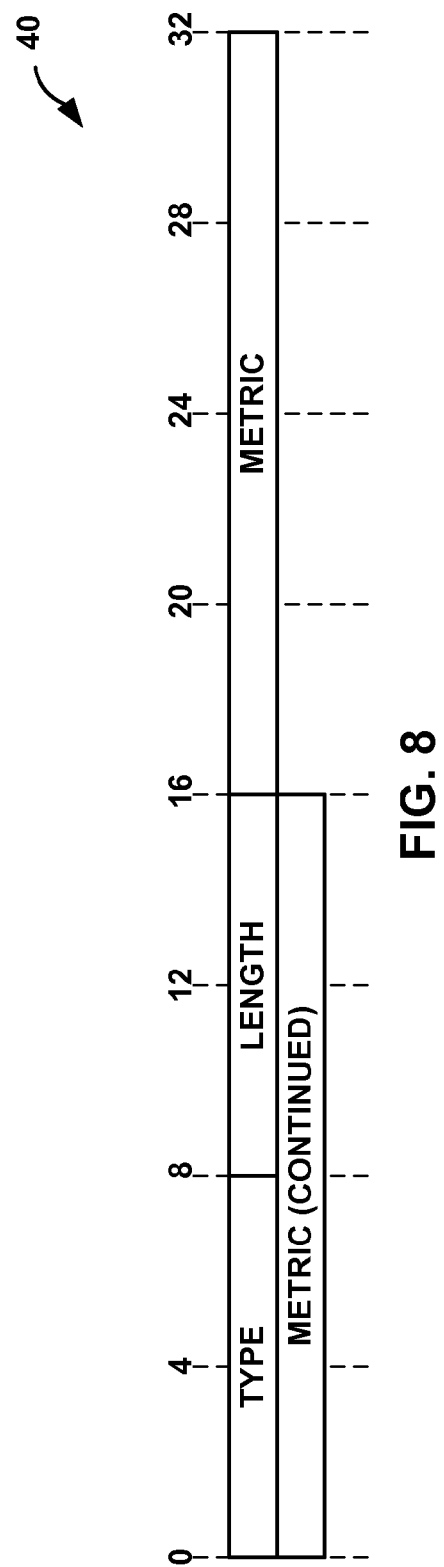
FIG. 8 illustrates an ERO Metric sub-TLV (Type 2), which is a Sub-TLV of the SID/Label Binding TLV.

FIG. 8 illustrates an ERO Metric sub-TLV (Type 2) 40, which is a Sub-TLV of the SID/Label Binding TLV. The ERO Metric sub-TLV carries the cost of an ERO path. It is used to compare the cost of a given source/destination path. A router may advertise the ERO Metric sub-TLV. The cost of the ERO Metric sub-TLV may be set to the cumulative IGP or TE path cost of the advertised ERO. Since manipulation of the Metric field may attract or distract traffic from and to the advertised segment it may be manually overridden.

Figure 9A:
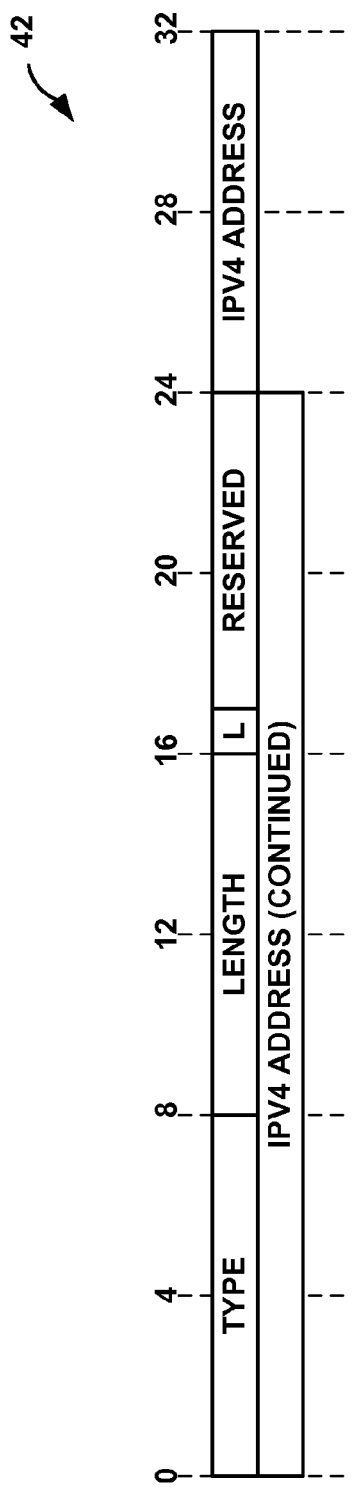
FIG. 9A illustrates an IPv4 ERO subTLV (Type 3), which is used to describe a path segment using IPv4 address style of encoding.

In this example, the ERO Metric sub-TLV 40 is defined as:
Type: 2
Length: 4
Metric: 4 bytes IPv4 ERO subTLV FIG. 9A illustrates an IPv4 ERO subTLV (Type 3) 42, which is used to describe a path segment using IPv4 address style of encoding. The 'L' bit in the Flags is a one-bit attribute. If the L bit is set, then the value of the attribute is 'loose.' Otherwise, the value of the attribute is 'strict.'

IPv6 ERO subTLV

Figure 9B:
FIG. 9B illustrates an IPv6 ERO subTLV (Type 4), which is used to describe a path segment using IPv6 Address style of encoding.

FIG. 9B illustrates an IPv6 ERO subTLV (Type 4) 44, which is used to describe a path segment using IPv6 Address style of encoding. The 'L' bit in the Flags is a one-bit attribute. If the L bit is set, then the value of the attribute is 'loose.' Otherwise, the value of the attribute is 'strict.'

Unnumbered Interface ID ERO subTLV

Figure 10:
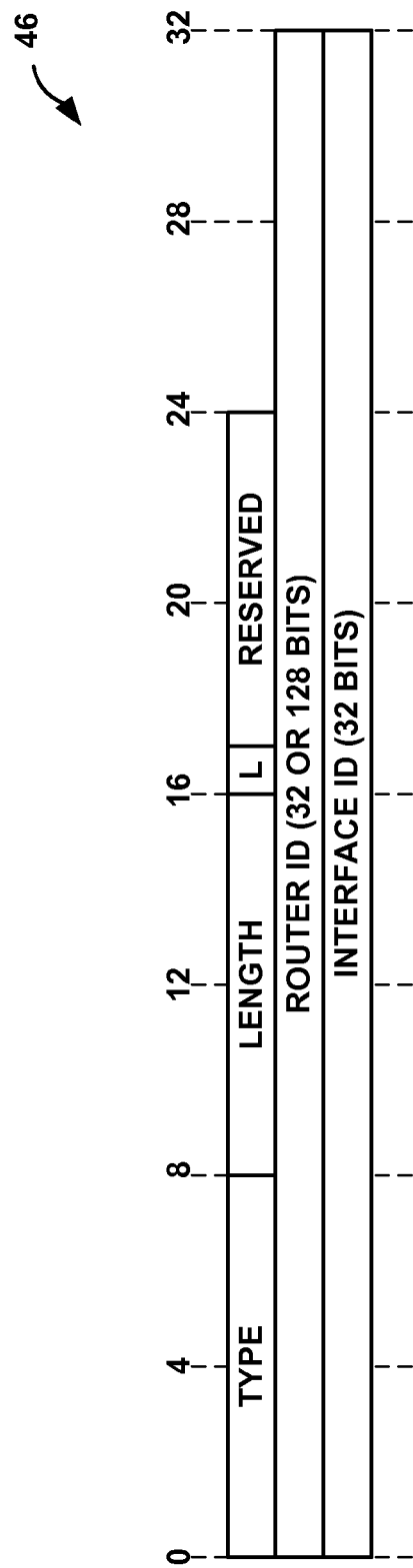
FIG. 10 illustrates an Unnumbered Interface-ID ERO subTLV (Type 5), which is used to describe a path segment that spans over an unnumbered interface.

FIG. 10 illustrates an Unnumbered Interface-ID ERO subTLV (Type 5) 46, which is used to describe a path segment that spans over an unnumbered interface. Unnumbered interfaces are referenced using the interface index. Interface indices are assigned local to the router and therefore not unique within a domain. All elements in an ERO path need to be unique within a domain and hence need to be disambiguated using a domain unique Router-ID.

The 'Router-ID' field contains the router ID of the router which has assigned the 'Interface ID' field. Its purpose is to disambiguate the 'Interface ID' field from other routers in the domain.

IS-IS supports two Router-ID formats:
(TLV 134, 32-Bit format), AND
(TLV 140, 128-Bit format).

The actual Router-ID format gets derived from the 'Length' field. For 32-Bit Router-ID width the subTLV length is set to 8 octets. For 128-Bit Router-ID width the subTLV length is set to 20 octets.

The 'Interface ID' is the identifier assigned to the link by the router specified by the router ID.

The 'L' bit in the Flags is a one-bit attribute. If the L bit is set, then the value of the attribute is 'loose.' Otherwise, the value of the attribute is 'strict.'

IPv4 Backup ERO subTLV

Figure 11A:
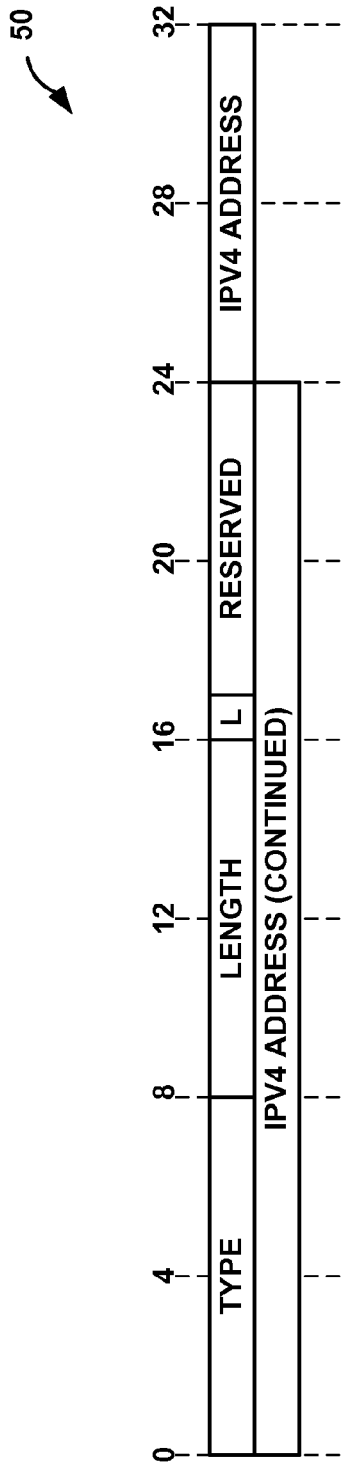
FIG. 11A illustrates an IPv4 Backup ERO subTLV (Type 6), which is used to describe a Backup path segment using IPv4 Address style of encoding.

FIG. 11A illustrates an IPv4 Backup ERO subTLV (Type 6) 50, which is used to describe a Backup path segment using IPv4 Address style of encoding. The 'L' bit in the Flags is a one-bit attribute. If the L bit is set, then the value of the attribute is 'loose.' Otherwise, the value of the attribute is 'strict.'

IPv6 Backup ERO subTLV

Figure 11B:
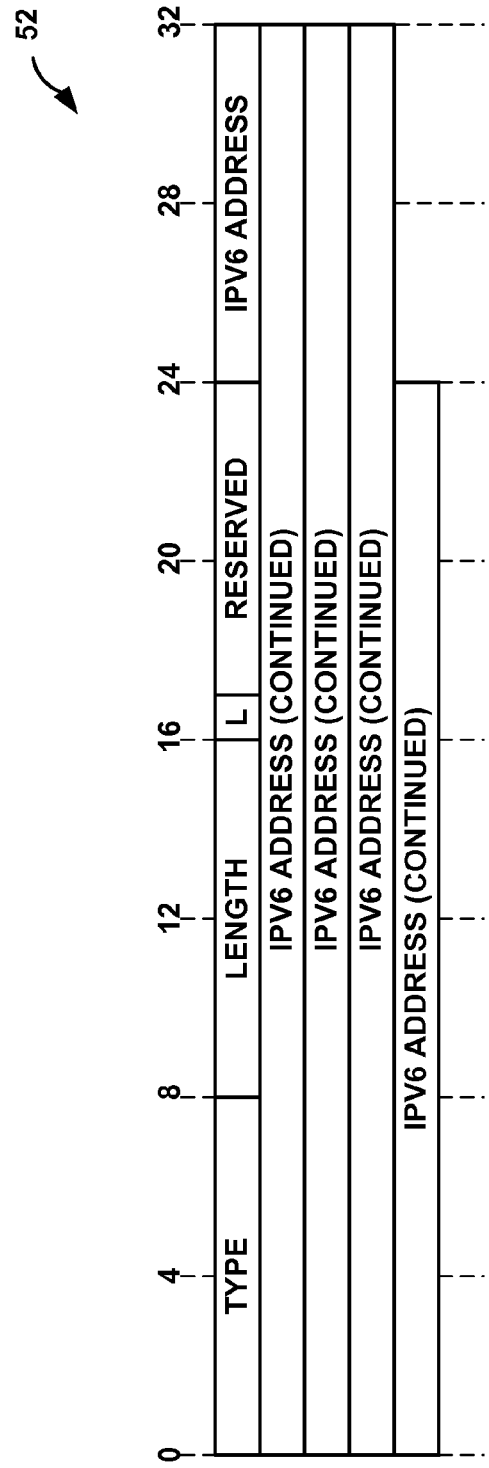
FIG. 11B illustrates an IPv6 Backup ERO subTLV (Type 7), which is used to describe a Backup path segment using IPv6 Address style of encoding.

FIG. 11B illustrates an IPv6 Backup ERO subTLV (Type 7) 52, which is used to describe a Backup path segment using IPv6 Address style of encoding. The 'L' bit in the Flags is a one-bit attribute. If the L bit is set, then the value of the attribute is 'loose.' Otherwise, the value of the attribute is 'strict.'

Unnumbered Interface ID Backup ERO subTLV

Figure 12:
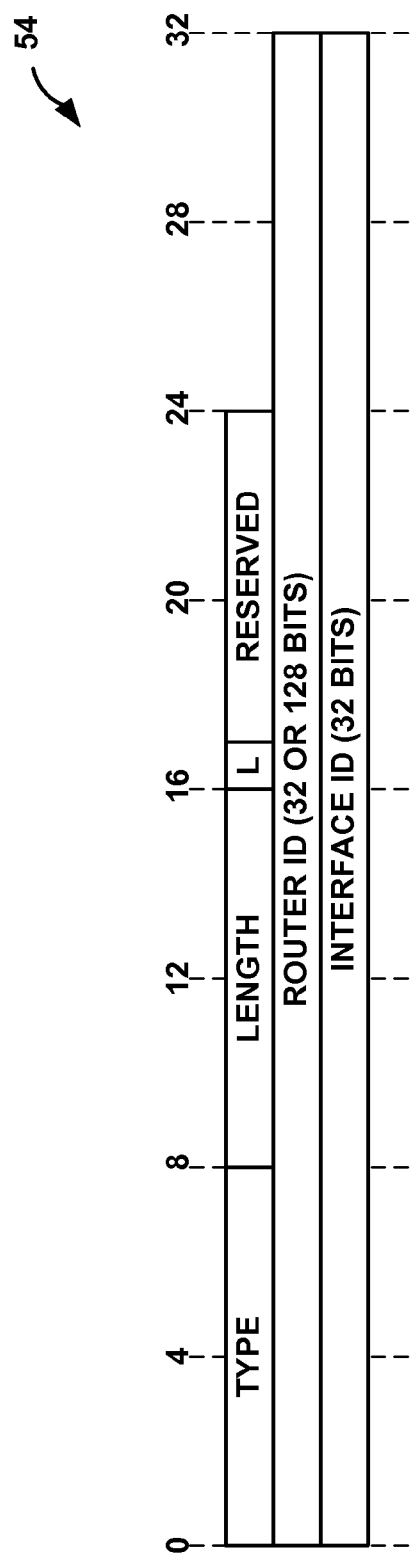
FIG. 12 illustrates an Unnumbered Interface-ID Backup ERO subTLV (Type 8), which is used to describe a Backup LSP path segment that spans over an unnumbered interface.

FIG. 12 illustrates an Unnumbered Interface-ID Backup ERO subTLV (Type 8) 54, which is used to describe a Backup LSP path segment that spans over an unnumbered interface. Unnumbered interfaces are referenced using the interface index. Interface indices are assigned local to the router and therefore not unique within a domain. All elements in an ERO path need to be unique within a domain and hence need to be disambiguated using a domain unique Router-ID.

The 'Router-ID' field contains the router ID of the router which has assigned the 'Interface ID' field. Its purpose is to disambiguate the 'Interface ID' field from other routers in the domain.

IS-IS supports two Router-ID formats:
(TLV 134, 32-Bit format) [RFC5305]
(TLV 140, 128-Bit format) [RFC6119]

The actual Router-ID format is derived from the 'Length' field.

For 32-Bit Router-ID width the subTLV length is set to 8 octets.

For 128-Bit Router-ID width the subTLV length is set to 20 octets.

The 'Interface ID' is the identifier assigned to the link by the router specified by the router ID.

The 'L' bit in the Flags is a one-bit attribute. If the L bit is set, then the value of the attribute is 'loose.' Otherwise, the value of the attribute is 'strict.'

Prefix ERO and Prefix Backup ERO subTLV Path Semantics

All 'ERO' and 'Backup ERO' information represents an ordered set which describes the segments of a path. The last ERO subTLV describes the segment closest to the egress point of the path. Contrary the first ERO subTLV describes the first segment of a path. If a router extends or stitches a label switched path, the router prepends the new segments path information to the ERO list. The same ordering applies for the Backup ERO labels. An implementation may first encode all primary path EROs followed by the bypass EROS.

SR-Capabilities TLV

In Segment Routing, each router to advertise its SR data-plane capability and the range of SID/Label values it uses for Segment Routing. Data-plane capabilities and SID/Label ranges are advertised using the newly defined SR-Capabilities.

Figure 13:
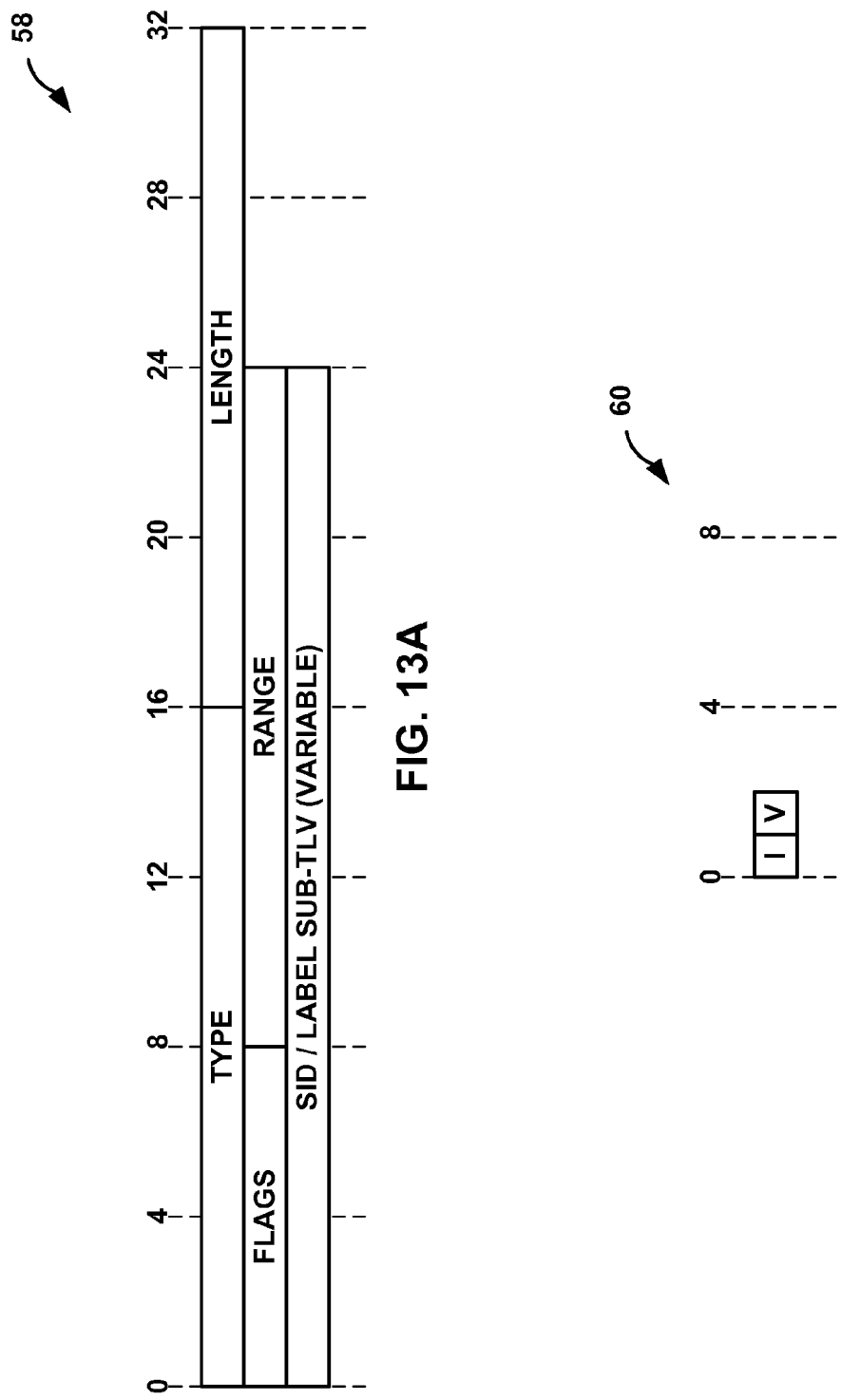
FIGS. 13A, 13B illustrate an SR Capabilities TLV (Type 1031), which is optional and may appear multiple times.

FIG. 13A illustrates an SR Capabilities TLV (Type 1031) 58, which is optional and may appear multiple times. In the example of FIG. 13A, SR Capabilities TLV (Type 1031) 58 is defined as:

Type: 1031
Length: variable.
Flags: 1 octet of flags as shown in FIG. 13B. The following are defined:
  I-Flag: IPv4 flag. If set, then the router is capable of outgoing IPv4 encapsulation on all interfaces.
  V-Flag: IPv6 flag. If set, then the router is capable of outgoing IPv6 encapsulation on all interfaces.
  Range: 2 octets value defining the number of values of the range from the starting value defined in the SID/Label Sub-TLV.
  SID/Label Sub-TLV: SID/Label value as defined herein.

If multiple occurrence of the SR-Capabilities TLV are advertised by the same router, only the Flags in the first occurrence of the Sub-TLV are to be taken into account.

SR-Algorithm TLV

Figure 14:
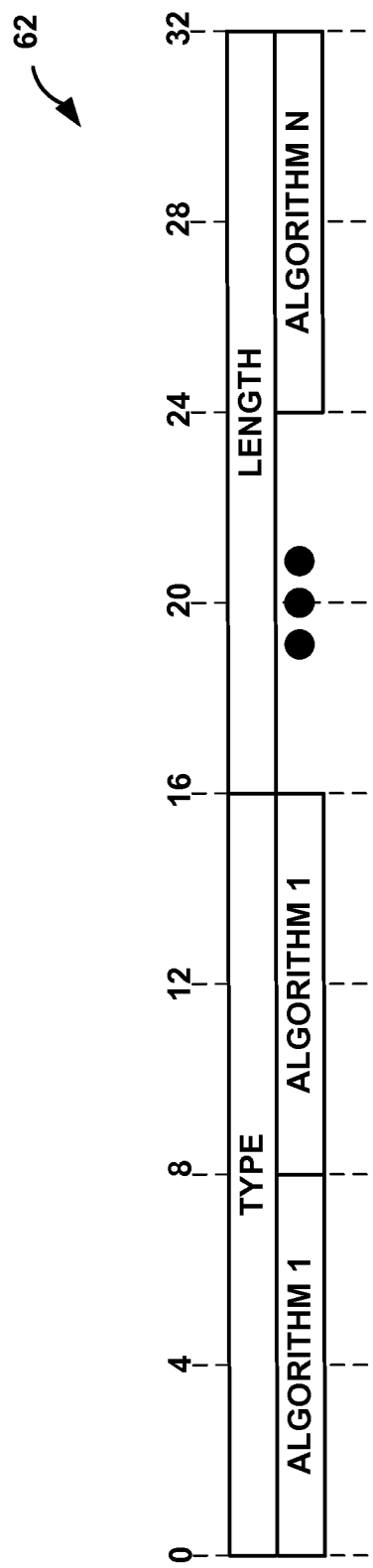
FIG. 14 illustrates an SR-Algorithm Sub-TLV (Type 1032), which allows the router to advertise the algorithms that the router is currently using for calculating hop-by-hop paths.

The router may use various algorithms when calculating reachability to other nodes or to prefixes attached to these nodes. Examples of these algorithms are metric based Shortest Path First (SPF), various sorts of Constrained SPF, etc. FIG. 14 illustrates an SR-Algorithm Sub-TLV (Type 1032) 52, which allows the router to advertise the algorithms that the router is currently using for calculating hop-by-hop paths. The following value has been defined:

0: Shortest Path First (SPF) algorithm based on link metric.

The SR-Algorithm TLV is optional and it typically only appears a single time inside a node descriptor NLRI. If the SID-Label Capability TLV is advertised then the SR-Algorithm TLV is also advertised.

In the example of FIG. 14, Sub-TLV (Type 1032) 52 is defined as:

Type: 1032
Length: variable.
Algorithm: 1 octet of algorithm

Link Attribute TLVs

Link attribute TLVs are TLVs that may be encoded in the BGP-LS attribute with a link NLRI. Each 'Link Attribute' is a Type/Length/Value (TLV) triplet formatted as defined above.

In one example, the following 'Link Attribute' TLVs are valid in the LINK_STATE attribute:

TABLE 2

| TLV CODE POINT | DESCRIPTION | LENGTH |
| --- | --- | --- |
| 1099 | ADJACENCY SEGMENT IDENTIFIER (ADJ-SID) TLV | VARIABLE |
| 1100 | LAN ADJACENCY SEGMENT IDENTIFIER (ADJ-SID) TLV | VARIABLE |

Adjacency Segment Identifier (Adj-SID) TLV

Figure 15A:
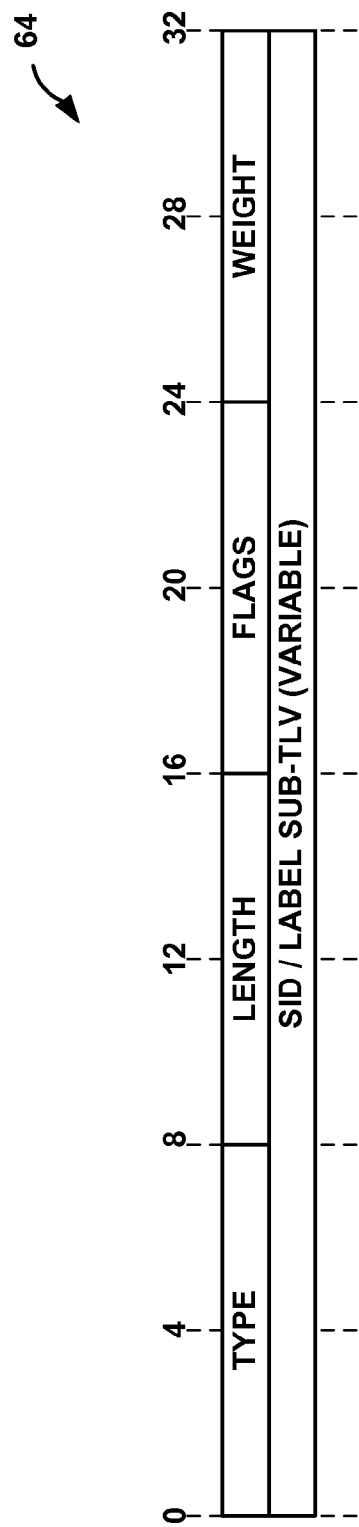
FIGS. 15A, 15B show an example Adj-SID Sub-TLV.
Figure 15B:
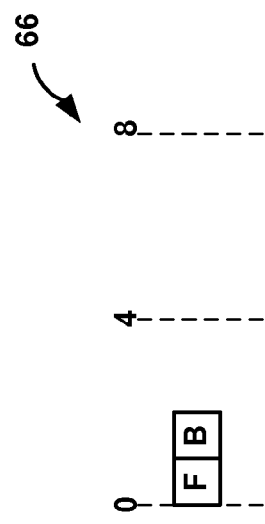

FIGS. 15A, 15B show an example Adj-SID Sub-TLV 64, where:

Type: 1099
Length: variable.
Flags: 1 octet field shown in FIG. 15B having the following flags:
  F-Flag: Address-Family flag. If unset, then the Adj-SID refers to an adjacency with outgoing IPv4 encapsulation. If set then the Adj-SID refers to an adjacency with outgoing IPv6 encapsulation.
  B-Flag: Backup flag. If set, the Adj-SID refers to an adjacency being protected (e.g.: using IPFRR or MPLS-FRR).
  Other bits: zero when originated and ignored when received.
Weight: 1 octet. The value represents the weight of the Adj-SID for the purpose of load balancing.
SID/Label Sub-TLV: contains the SID/Label value.

An SR capable router may allocate an Adj-SID for each of its adjacencies and may set the B-Flag when the adjacency is protected by a FRR mechanism (IP or MPLS).

The F-flag is used in order for the router to advertise the outgoing encapsulation of the adjacency to which the Adj-SID is attached.

Adjacency Segment Identifiers (Adj-SID) LAN TLV

In LAN subnetworks, the Designated Intermediate System (DIS) is elected and originates the Pseudonode-LSP (PN-LSP) including all neighbors of the DIS. When Segment Routing is used, each router in the LAN may advertise the Adj-SID of each of its neighbors. Since, on LANs, each router only advertises one adjacency to the Pseudonode (and doesn't advertise any other adjacency), each router advertises the set of Adj-SIDs (for each of its neighbors) inside a newly defined TLV part of the NLRI advertising the adjacency to the Pseudonode.

Figures 16A, 16B:
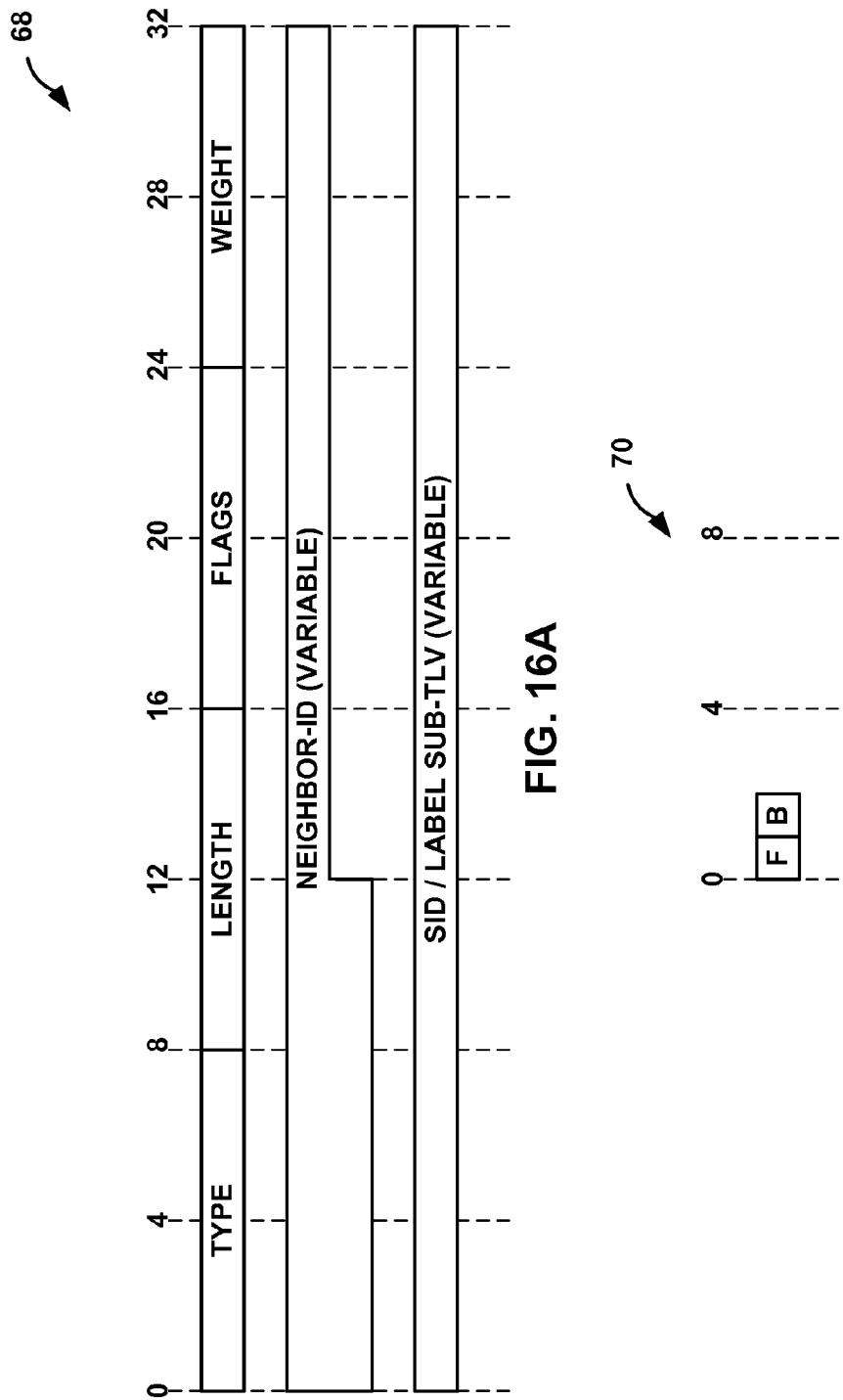
FIGS. 16A, 16B illustrates a new TLV: LAN-Adj-SID (Type 1100), which contains the set of Adj-SIDs the router assigned to each of its LAN neighbors.

FIG. 16A illustrates a new TLV: LAN-Adj-SID (Type 1100) 68, which contains the set of Adj-SIDs the router assigned to each of its LAN neighbors. The format of the LAN-Adj-SID Sub-TLV 68 is shown in FIG. 16A where:

Type: 1100.
Length: variable.
Flags: 1 octet field shown in FIG. 16B having the following flags:
  F-Flag: Address Family flag. If unset, then the Adj-SID refers to an adjacency with outgoing IPv4 encapsulation. If set then the Adj-SID refers to an adjacency with outgoing IPv6 encapsulation.
  B-Flag: Backup flag. If set, the LAN-Adj-SID refers to an adjacency being protected (e.g.: using IPFRR or MPLS-FRR).
  Other bits: zero when originated and ignored when received.
Weight: 1 octet. The value represents the weight of the Adj-SID for the purpose of load balancing.
Neighbor-ID: 4 or 6 octets of a neighbor-ID. If the NLRI protocol type in the BGP LS header is IS-IS L1 or IS-IS L2 then the length equals to 6 octets. In all other cases the neighbor-ID length is 4 octets.

SID/Label Sub-TLV: contains the SID/Label value.

Multiple LAN-Adj-SID Sub-TLVs may be encoded.

Prefix Attribute TLVs

Prefix attribute TLVs are the TLVs that may be encoded in the BGP-LS attribute with a Prefix NLRI (Type 3 and 4). Each 'Node Attribute' is a Type/Length/Value (TLV) triplet formatted as defined above. The following 'Prefix Attribute' TLVs are valid in the BGP LINK_STATE attribute:

TABLE 3

| TLV CODE POINT | DESCRIPTION | LENGTH |
| --- | --- | --- |
| 1158 | PREFIX SID | VARIABLE |

Prefix Segment Identifier (Prefix-SID TLV)

Figure 17A:
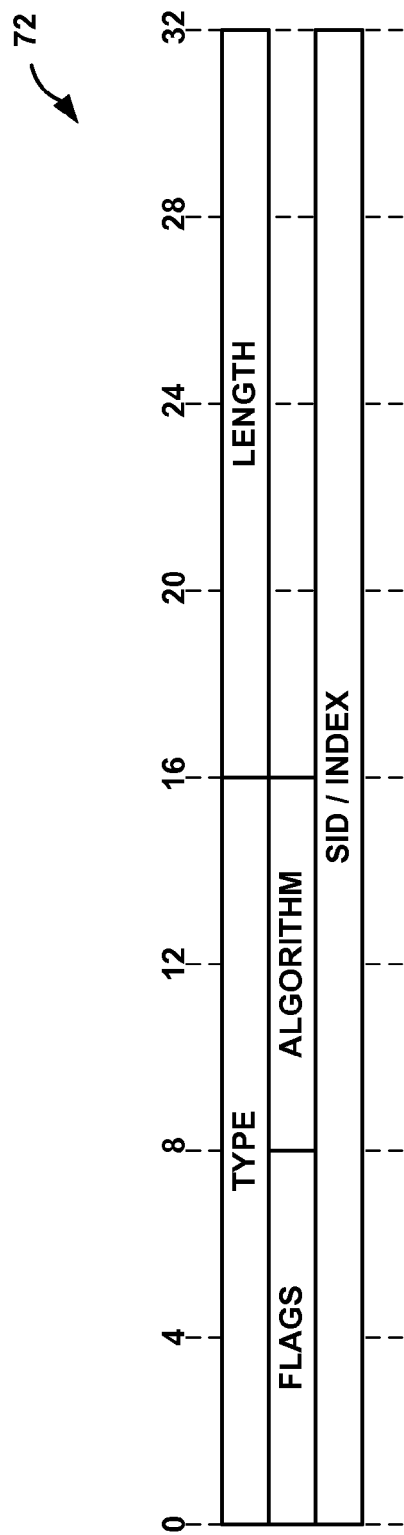
FIGS. 17A, 17B illustrate a Prefix-SID TLV, which is used to carry the Segment Routing Prefix-SID.

FIG. 17A illustrates a Prefix-SID TLV 72, which is used to carry the Segment Routing Prefix-SID. The 'Prefix SID' is unique within a given IGP domain. The 'Prefix SID' is an index to determine the actual SID/label value inside the set of all advertised SID/label ranges of a given router. A receiving router uses the index to determine the actual SID/label value in order to construct forwarding state to a particular destination router.

In many use-cases a 'stable transport' IP Address is overloaded as an identifier of a given node. Because the IP Prefixes may be re-advertised into other levels there may be some ambiguity (e.g. Originating router vs. L1L2 router) for which node a particular IP prefix serves as identifier. The Prefix-SID TLV contains the necessary flags to disambiguate IP Prefix to node mappings. Furthermore if a given node has several 'stable transport' IP addresses there are flags to differentiate those among other IP Prefixes advertised from a given node.

Prefix-SID Sub-TLV 72 is defined in FIG. 17A as:

Type: 1158

Length: variable.

Figure 17B:
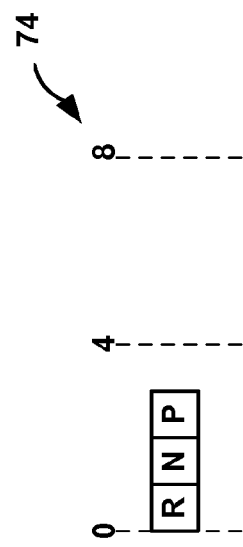

Flags: 1 octet field shown in FIG. 17B having the following flags:

R-Flag: Re-advertisement flag. If set, then the prefix to which this Prefix-SID is attached, has been propagated by the router either from another level (i.e.: from IS-IS level-1 to IS-IS level-2, from OSPF Area 0 to OSPF Area non-zero, or the opposite) or from redistribution (e.g.: from another protocol).

N-Flag: Node-SID flag. Optional and, if set, then the Prefix-SID refers to the router identified by the prefix. Typically, the N-Flag is set on Prefix-SIDs attached to a router loopback address. The N-Flag is set when the Prefix-SID is a Node-SID as described in [I-D.filsfils-rtgwg-segment-routing].

P-Flag: no-PHP flag. If set, then the penultimate hop does not pop the Prefix-SID before delivering the packet to the node that advertised the Prefix-SID.

Other bits: zero when originated and ignored when received.

Algorithm: the router may use various algorithms when calculating reachability to other nodes or to prefixes attached to these nodes. Examples of these algorithms are metric based Shortest Path First (SPF), various sorts of Constrained SPF, etc. The Algorithm field allows a router to advertise algorithms that router is currently using. SR-Algorithm TLV has following structure: one octet identifying the algorithm to which the Prefix-SID is associated. Currently, the following value has been defined:

0: Shortest Path First (SPF) algorithm based on link metric.

SID/Index: 32 bit index defining the offset in the SID/Label space advertised by this router using the encodings defined herein.

Multiple Prefix-SIDs Sub-TLVs may appear on the same prefix in which case each SID is encoded as a separate Sub-TLV. When multiple Prefix-SID Sub-TLVs are present, the receiving router uses the first encoded SID and may use the subsequent ones.

The No-PHP flag should be set on the Prefix-SIDs associated with reachability advertisements which were originated by other routers and leaked (either from Level-1 to Level-2 or vice versa).

The R-Flag is set for prefixes that are not local to the router and either:

advertised because of propagation (Level-1 into Level-2);

advertised because of leaking (Level-2 into Level-1);

advertised because redistribution (e.g.: from another protocol).

In the case where a Level-1-2 router has local interface addresses configured in one level, it may also propagate these addresses into the other level. In such case, the Level-1-2 router does not set the R bit. The R-bit set only for prefixes that are not local to the router and advertised by the router because of propagation and/or leaking.

The N-Flag is used in order to define a Node-SID. A router may set the N-Flag only if all of the following conditions are met:

The prefix to which the Prefix-SID is attached is local to the router. I.e.: the prefix is configured on one of the local interfaces. (e.g.: 'stable transport' loopback).

The prefix to which the Prefix-SID is attached has a Prefix length of either/32 (IPv4) or/128 (IPv6).

The router ignores the N-Flag on a received Prefix-SID if the prefix has a Prefix length different than/32 (IPv4) or/128 (IPv6). The router behavior determined by the P, R and N flags are described in Filsfils et. al.

BGP Next Hop Information

BGP link-state information for both IPv4 and IPv6 networks can be carried over either an IPv4 BGP session, or an IPv6 BGP session. If IPv4 BGP session is used, then the next hop in the MP_REACH_NLRI may be an IPv4 address. Similarly, if IPv6 BGP session is used, then the next hop in the MP_REACH_NLRI may be an IPv6 address. Usually the next hop will be set to the local end-point address of the BGP session. The next hop address is encoded as described in RFC4760. The length field of the next hop address will specify the next hop address-family. If the next hop length is 4, then the next hop is an IPv4 address; if the next hop length is 16, then it is a global IPv6 address and if the next hop length is 32, then there is one global IPv6 address followed by a link-local IPv6 address. The link-local IPv6 address should be used. For VPN SAFI, as per custom, an 8 byte route-distinguisher set to all zero is prepended to the next hop.

The BGP Next Hop attribute is used by each BGP-LS speaker to validate the NLRI it receives. However, this specification does not mandate any rule regarding the re-write of the BGP Next Hop attribute.

TE Controller Operation

Figure 18:
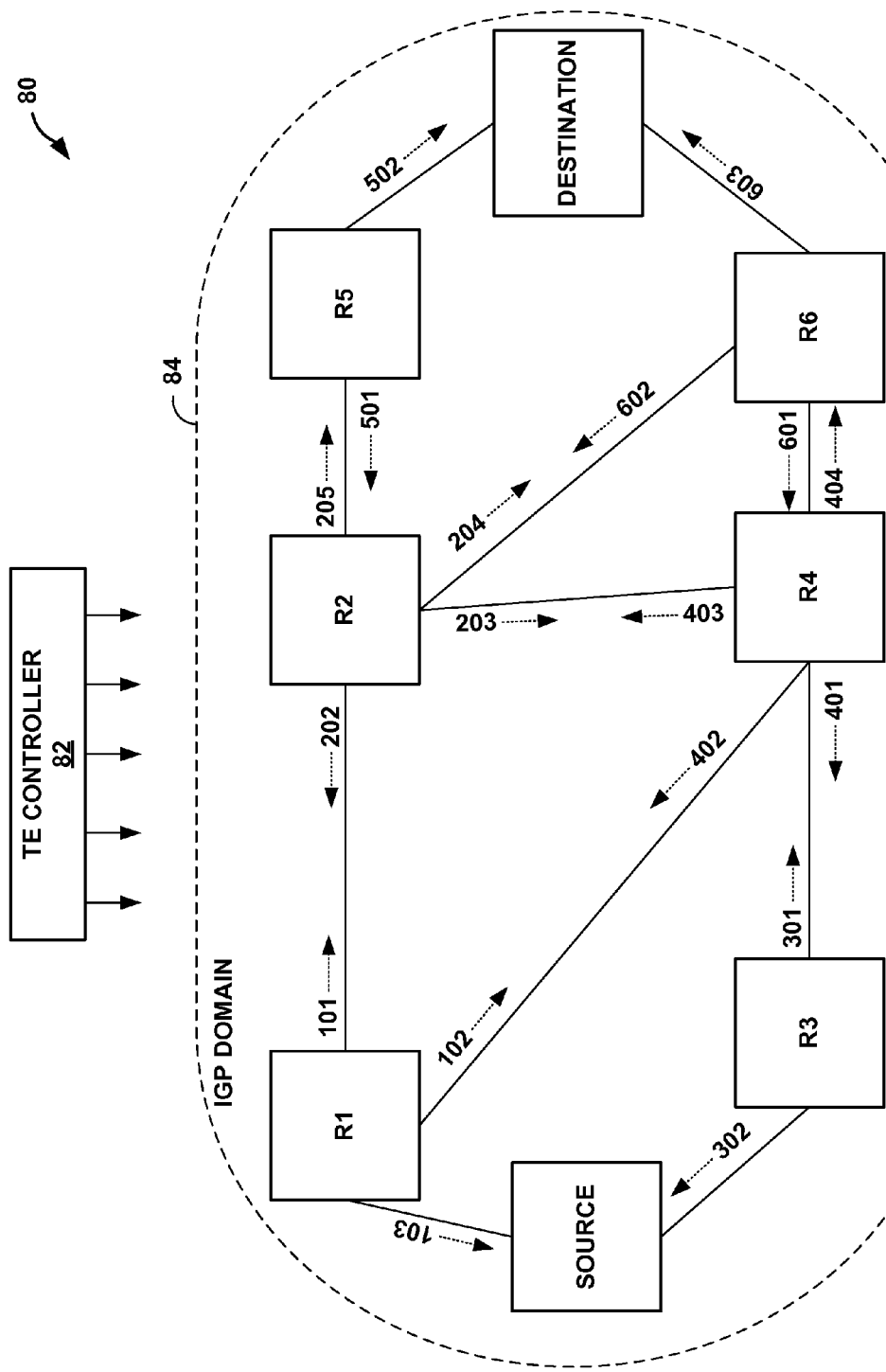
FIG. 18 illustrates an example network in which a TE controller constructs paths from a source router to a destination router.

FIG. 18 illustrates an example network 80 in which a TE controller 82 constructs paths from a source router to a destination router across a plurality of IGP domains 84. In this example, each of routers R1-R6 utilize intra-IGP area segment routing to advertise 1-hop LSPs to their respective neighbors. For example, as shown, router R2 advertises local labels 202, 203, 204 and 205 on links to neighboring routers R1, R4, R6 and R5 to establish 1-hop LSPs that terminate at the neighboring routers. Similarly, router R1 advertises local labels 101, 102, and 103. Router R3 advertises local labels 301 and 302. Router R4 advertises local labels 401, 402, 403, and 404. Router R5 advertises local labels 501, 502. Router R6 advertises local labels 601, 602, and 603.

In this way, each router advertises 1-hop LSPs for each link within IGP domain 84, where each 1-hop LSP terminates at the next hop router along the link. As such, using segment routing within IGP domain 84, each router R1-R6 advertises its labels within IGP domain 84 as separate IGP segment identifiers and binds the labels with a forwarding equivalence class (FEC) associated with the destination. Each router R1-R6 floods the advertised labels such that each router maintains a TE database having link state information for IGP domain 84 including the segment routing, i.e., the IGP path segments associated with the 1-hop labels.

TE controller 82 collects the link state information from the TE databases of one or more of routers R1-R6 using an exterior routing protocol, as described herein. Moreover, TE controller 82 is able to instruct network 80 to set up "paths" internal to IGP domain 84 by injecting paths as if the Ingress Node would have reported a "path." By setting the router-ID of an ingress router in the node-descriptor a target node knows that it has to take action and program a forwarding path. For distinguishing the 'instructed' path and the actual programmed path a router is using, two new protocol-IDs are used in the NLRI header.

Protocol-ID=8: PCE-S, The NLRI information has been sourced by a Path computation Element Server (PCE-S)

Protocol-ID=9: PCE-C, The NLRI information has been sourced by a Path computation Element Client (PCE-C)

The above two Protocol-IDs are used a simple feedback mechanism to see if the actual path has been programmed and is ready for use.

Assume TE controller 82 wants to instruct the source router to setup a path to destination router with the following ERO: {R1, R4, R2, R6, D}. From reading the link state database, TE controller 82 knows that a 1-hop LSP Segment is advertised for each link within IGP-domain 84. In accordance with the example encoding described herein, TE-controller 82 generates a BGP NLRI with protocol type 'PCE-S', source node-descriptor router 'S' and a destination node-descriptor router 'D' along with a list of the ERO elements plus their corresponding 1-hop LSP segment IDs how to reach the next node. Note that the ERO and the Label/SID objects are encoded in pairs.

protocol-ID 'PCE-S':
    {source node descriptor 'S'}
    {destination node descriptor 'D'}
    {ERO: R1, SID/label: none}
    {ERO: R4, SID/label: R1→R4}
    {ERO: R2, SID/label: R4→R2}
    {ERO: R6, SID/label: R2→R6}
    {ERO: D, SID/label: R6→D}

A receiving router (e.g., any of routers R1-R6) installs an entry to destination router 'D' in its tunnel RIB along with the full stacked label set. As per the above example this results in a label stack of 4 labels: {102, 403, 204, 603}. As such, the stack of labels defines the ERO and can be prepended in its entirety by the source to the a packet in order to accomplish explicit routing of the packet from the source to the destination. Using penultimate popping, each router along the path {R1, R4, R2, R6} pops its respective 1-hop label and forwards the packet. As such, use of explicit routing in this manner may eliminate any requirement to signal forwarding state for the path between routers R1-R6 of IGP domain 84.

Upon receiving a BGP encoding defining an IGP path, a receiving router R1-R6 informs TE-controller 82 that the forwarding entry has been successfully programmed by re-advertising the path with a different protocol-ID code. In addition the individual labels of the stack will be omitted. The only Label/SID which gets advertised is a new Label/SID <N> which keys the quad push as instructed by TE-controller:

protocol-ID 'PCE-C':
    {source node descriptor 'S'}
    {destination node descriptor 'D'}
    SID/label: <N>
    {ERO: R1}
    {ERO: R4}
    {ERO: R2}
    {ERO: R6}
    {ERO: D}

In this way, the techniques provide feedback allowing TE controller 82 to trigger direction of packet data along the path only once the next hop routers within a given IGP domain have installed forwarding state for the path.

Configuration Management

In one example, the extensions described herein are only activated between BGP peers after capability negotiation. Moreover, the extensions can be turned on/off an individual peer basis, so the extension can be gradually rolled out in the network.

In some examples, a network operator may use a dedicated Route-Reflector infrastructure to distribute Link-State NLRIs to reduce any potential for the frequency of Link-State NLRI updates to interfere with regular BGP prefix distribution.

Distribution of Link-State NLRIs may be limited to a single admin domain, which can consist of multiple areas within an AS or multiple ASes.

In some example implementations, an operator may specify neighbors to which Link-State NLRIs will be advertised and from which Link-State NLRIs will be accepted.

In some example implementations, an operator may specify a maximum rate at which Link-State NLRIs will be advertised/withdrawn from neighbors.

In some example implementations, an operator may specify a maximum number of Link-State NLRIs stored in router's RIB.

In some example implementations, an operator may create abstracted topologies that are advertised to neighbors or create different abstractions for different neighbors.

In some example implementations, an operator may configure a 64-bit instance ID.

In some example implementations, an operator may configure a pair of ASN and BGP-LS identifier per flooding set the node participates in.

In some example implementations, one or more BGP speakers provide the following statistics:

Total number of Link-State NLRI updates sent/received
Number of Link-State NLRI updates sent/received, per neighbor Number of errored received Link-State NLRI updates, per neighbor Total number of locally originated Link-State NLRIs In some example implementations, an operator may specify ACLs to limit inbound updates as follows:

Drop all updates from Consumer peers

The following table lists all TLVs/Sub-TLVs defined in this document:

TABLE 4

| TLV CODE POINT | DESCRIPTION | LENGTH |
|---|---|---|
| 1030 | SID/LABEL BINDING | VARIABLE |
| 1031 | SR CAPABILITIES | VARIABLE |
| 1032 | SR ALGORITHM | VARIABLE |
| 1099 | ADJACENCY SEGMENT IDENTIFIER (ADJ-SID) TLV | VARIABLE |
| 1100 | LAN ADJACENCY SEGMENT IDENTIFIER (ADJ-SID) TLV | VARIABLE |
| 1158 | PREFIX SID | VARIABLE |

Figure 19:
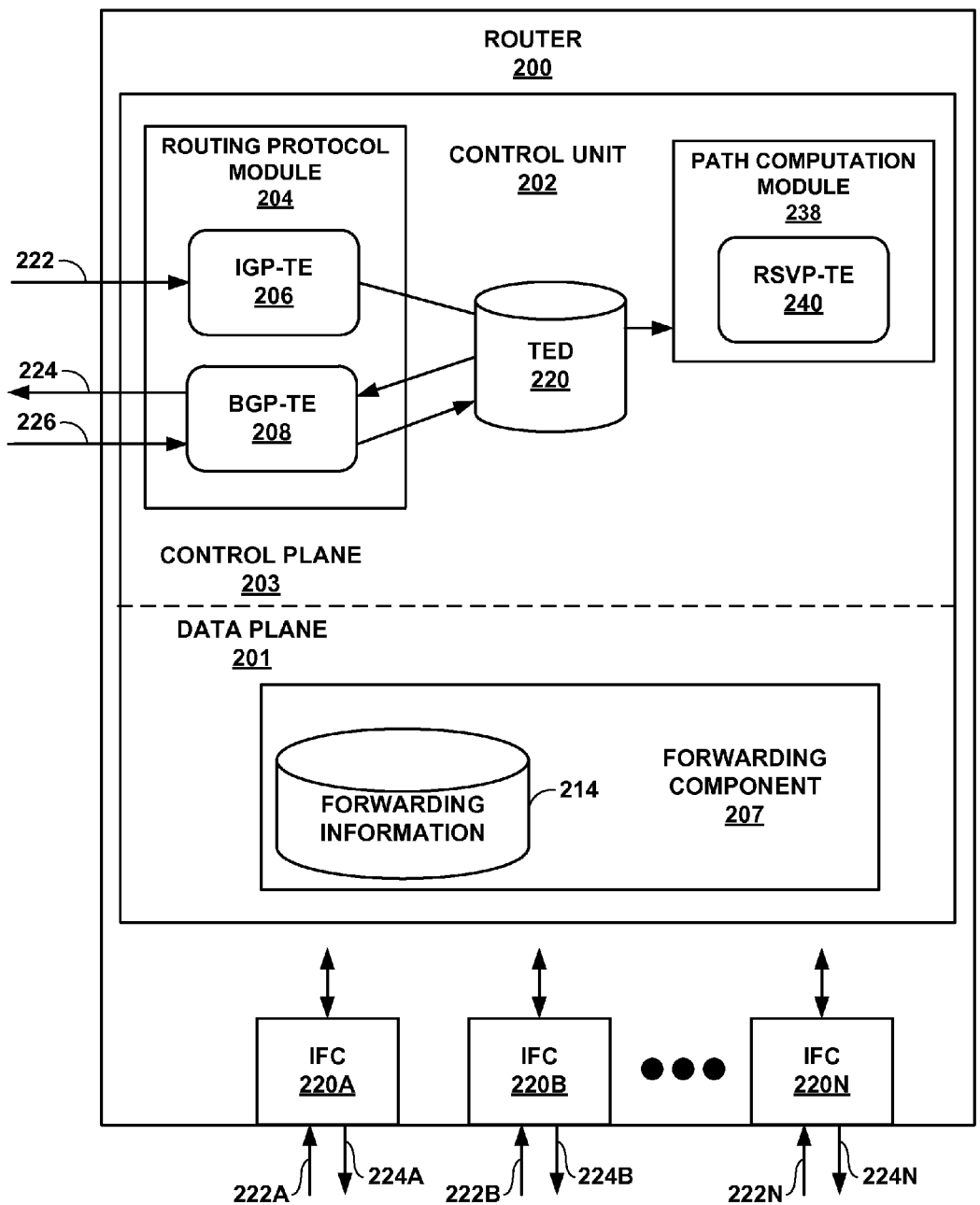
FIG. 19 is a block diagram illustrating a detailed example router that originates and receives BGP messages that include an attribute that specifies IGP path information as described in this disclosure.

FIG. 19 is a block diagram illustrating an example router 200 that originates and receives routing protocol messages in accordance with an exterior routing protocol, e.g., BGP, where the routing messages include EGP reachability information that encodes interior gateway protocol (IGP) link state "path" information for the plurality of IGP routing domains. Router 200 may represent an example instance of the routers described herein that perform encoding and decoding to advertise link state path information with BGP. For example, router 200 may represent an example implementation of BGP speaker 8A that is logically part of IGP routing domain 10A.

In the example of FIG. 19, network device 200 includes a control unit 202 that comprises data plane 201 and control plane 203. Data plane 201 includes forwarding component 207. In addition, router 200 includes a set of interface cards (IFCs) 220A-220N (collectively, "IFCs 220") for communicating packets via inbound links 222A-222N (collectively, "inbound links 222") and outbound links 224A-224N (collectively, "outbound links 224"). Router 200 may also include a switch fabric (not shown) that couples IFCs 220 and forwarding component 207.

Forwarding component 35 represents hardware and logic functions that provide high-speed forwarding of network traffic. Forwarding component 35 typically includes a set of one or more forwarding chips programmed with FIB 44 that maps network destinations with specific next hops and the corresponding output interface ports. In general, when router 200 receives a packet via one of inbound links 222, forwarding component 207 identifies an associated next hop for the data packet by traversing forwarding information 214 based on information within the packet. Forwarding component 207 forwards the packet on one of outbound links 224 mapped to the corresponding next hop in accordance with forwarding information 214.

In this example, control plane 203 of router 200 provides an operating environment for executing routing protocol module 204, e.g., a routing engine, which may comprise one or more routing protocol software processes that implement interior and exterior routing protocols to exchange routing and other traffic engineering information with other network devices. In some instances, responsibility for executing various routing protocols may be allocated among respective processes.

As shown in FIG. 19, routing protocol module 204, e.g., a routing engine, executes Interior Gateway Protocol with Traffic Engineering extensions (IGP-TE) 206 to receive link state information in TE link advertisements 222 issued by other routers for one or more traffic engineering (TE) links in an IGP routing area in which router 200 is logically located. IGP-TE 206 may represent OSPF-TE or IS-IS-TE, for instance. TE link advertisements 222 may represent OSPF-TE Link State Advertisements or IS-IS-TE Link State Protocol Data Units. Routing protocol module 204, e.g., a routing engine, stores a representation of the received link state information, including traffic engineering information received for the TE links, to Traffic Engineering Database (TED) 220, a protocol-neutral database of TE links. Traffic engineering links stored to TED 220 may include physical IGP links (i.e., network links) as well as virtual links such as LSPs or GRE tunnels. IPG link state information stored within TED 220 includes link attributes such as local/remote IP addresses or router identifiers, local/remote interface indices, metric type and/or value, link bandwidth, reservable bandwidth, per CoS class reservation state, preemption value, and Shared Risk Link Group. Moreover, IPG link state information stored within TED 220 includes IGP path information for IPG path segments currently defined for the IPG routing domain. That is, IGP-TE 206 may implement segment routing within the respective IPG routing domain, and each IPG segment may be associated with a segment routing identifier and bound to a forwarding equivalence class for a destination of the path.

In some instances, router 200 includes path computation module 238 that computes traffic engineering paths (e.g., paths for TE LSPs) by executing a constrained shortest path first (CSPF) algorithm over TED 220 based on traffic engineering input constraints (e.g., available bandwidth). Path computation module 238 may then pass the traffic engineered paths to a path setup protocol such as RSVP-TE module 240 that reserves resources along respective computed paths to establish, e.g., TE LSPs as intra-domain IPG path segments.

Routing protocol module 204, e.g., a routing engine, also executes an exterior gateway protocol, such as Border Gateway Protocol with Traffic Engineering extensions (BGP-TE) 208, to peer with BGP speakers and BGP listeners to exchange routing information, including segment routing information for the IPG domain in accordance with techniques described herein. That is, routing protocol module 204 executes BGP-TE 208 to advertise IPG segment routing information (e.g., IPG path segments including segment identifiers and FEC bindings) stored to TED 220 using BGP routing messages 224 to replicate at least a portion of TED 220 across IGP area boundaries.

Routing protocol module 204, e.g., a routing engine, generates and programs forwarding component 207 with forwarding information 214 that associates network destinations with specific next hops and corresponding interface ports of IFCs 220 in accordance with routing information TE database 220. Routing protocol module 204 may generate forwarding information 214 in the form of a table, list, radix tree having leaf nodes that represent destinations within the network or other data structure.

Based on forwarding information 214, forwarding component 207 forwards packets received from inbound links 222A-222N to outbound links 224A-224N that correspond to next hops associated with destinations of the packets. U.S. Pat. No. 7,184,437 provides details on an exemplary embodiment of a router having a forwarding component that utilizes forwarding information for forwarding packets, the contents of which is incorporated herein by reference in its entirety.

In one example, forwarding component 207 is a rich and dynamic shared forwarding plane, optionally distributed over a multi-chassis router. Moreover, forwarding component 207 may be provided by dedicated forwarding integrated circuits normally associated with high-end routing components of a network router.

Control unit 202 may include one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. The architecture of router 200 illustrated in FIG. 2 is shown for exemplary purposes only. In other implementations, router 200 may be configured in a variety of ways. In one example, control unit 202 and its corresponding functionality may be distributed within IFCs 50. Control unit 202 may be implemented solely in software, or hardware, or may be implemented as a combination of software, hardware, or firmware. For example, control unit 202 may include one or more processors which execute software instructions. In that case, the various software modules of control unit 202, such as routing protocol module 204, may comprise executable instructions stored on a computer-readable medium, such as one or more of computer memory, computer readable-storage devices (e.g., hard disks and/or solid-state disks), or non-transitory computer-readable media.

Figure 20:
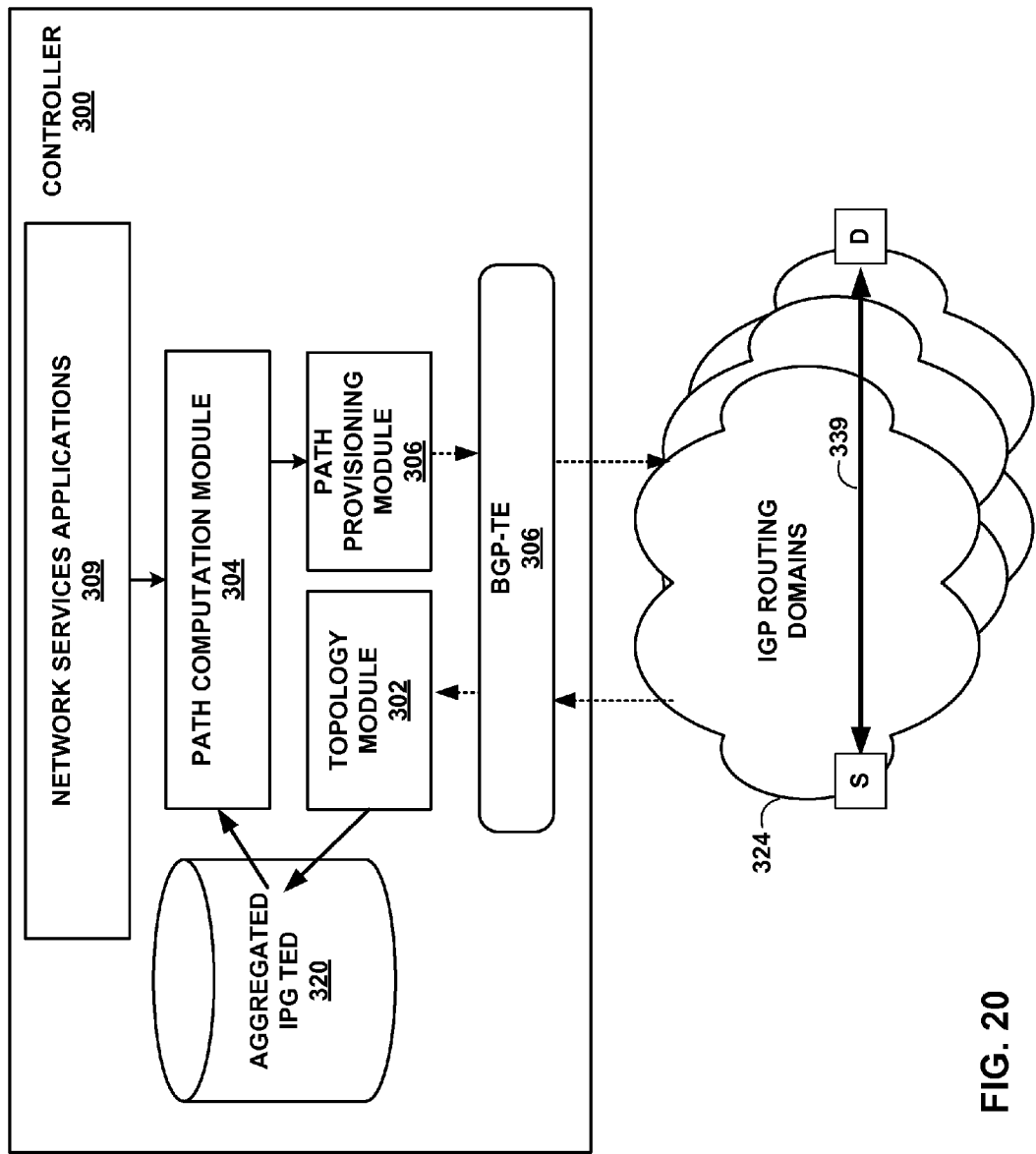
FIG. 20 is a block diagram illustrating an example controller in accordance with this disclosure.

FIG. 20 is a block diagram illustrating an example controller 300 in accordance with this disclosure. In this example, controller 300 provides an operating environment for topology module 302, path computation element 304, path provisioning module 306 and network services applications 309. In addition, controller 300 executes an extend exterior gateway protocol (e.g., BGP-TE 308) by which controller 300 sends and receives routing messages carrying topology information for multiple routing domains 324, wherein the routing messages conform to the exterior gateway protocol but also encode link state data specifying path information in the form of segment routing information for IPG path segments internal to the IPG routing domains.

As shown, topology module 302 receives, via BGP, segment routing link state information for IPG path segments within IPG routing domains 324 in accordance with the techniques described herein. Topology module 302 constructs aggregate link state database 320 that represents internal topologies of IGP routing domains 339 in accordance with the IGP link state information, including storing the IPG segment routing information received from routers deployed within the IGP routing domains.

Path computation module (PCM) 304 determines a path 339 across the plurality of IGP routing domains 324 by selecting one or more of the current IGP path segments from the IGP link state information within the aggregate link state database 320. Path provisioning module 306 invokes BGP-TE 308 to utilize the encoding techniques described herein and advertise the path to the routers deployed within the IGP domains.

Various embodiments of the invention have been described. These and other embodiments are within the scope of the following claims.

The invention claimed is:

1. A method for constructing a path across a plurality of interior gateway protocol (IGP) routing domains, the method comprising:
  generating, with a network device external to the IGP routing domains, a routing message that conforms to an exterior gateway protocol (EGP) and includes EGP reachability information that encodes interior gateway protocol (IGP) link state information for the plurality of IGP routing domains, wherein the EGP reachability information encodes the path within the IGP link state information as a sequence of IGP path segments associated with the plurality of IGP routing domains; and
  outputting, from the network device and in accordance with the EGP, the routing message to a plurality of routing devices, each of the routing devices being associated with a one of the IGP routing domains.

2. The method of claim 1, wherein the IGP link state information encoded by the EGP reachability information specifies, for each of the IPG path segments, a corresponding MPLS label to be used for forwarding packets along the respective IGP path segment.

3. The method of claim 2, wherein the EGP reachability information encodes the IGP path segments as a set of explicit route objects, each of the explicit route objects specifying a respective next hop along the path and a corresponding path segment identifier that defines the MPLS label to be used when forwarding the packets along the IGP path segment to a forwarding equivalence class (FEC) associated with a destination of the path.

4. The method of claim 1, wherein EGP reachability information is extended to specify IGP link state encodings for the following new segment routing identifiers: IGP prefix segment identifiers (SIDs), IGP-Adjacency SIDs, IGP-LAN-Adjacency SIDs and Binding SIDs.

5. The method of claim 1,
  wherein the EGP reachability information encodes within a single type-length-value structure both a primary path and a backup path that span the IGP multiple routing domains, and
  wherein the EGP reachability information encodes both the primary path and the backup path within the IGP link state information as a plurality of IGP path segments associated with the plurality of IGP routing domains.

6. The method of claim 1, further comprising:
  receiving, with the network device, one or more inbound routing messages from the routing devices associated with the IGP routing domains, wherein each of the routing messages conform to the exterior gateway protocol and includes EGP reachability information that encodes IGP link state information for the IGP routing domains, wherein the EGP reachability information encodes within the IGP link state information one or more existing IGP path segments internal to the plurality of IGP routing domains, each of the IGP path segments represented as a binding between a segment identifier and an MPLS label;
  constructing, with the network device, an aggregate link state database that represents internal topologies of the IGP routing domains in accordance with the IGP link state information;
  determining the path across the plurality of IGP routing domains by selecting one or more of the current IGP path segments from the IGP link state information within the aggregate link state database; and
  generating the routing message in accordance with the selected one or more IPG path segments.

7. The method of claim 1 wherein the network device comprises one of a router, a path computation element and a software defined network (SDN) controller.

8. A network device comprising:
an aggregate link state database storing interior gateway protocol (IGP) link state information for a plurality of IGP routing domains;
a path computation element executed by a processor configured to select, based on the link state database, a path across the plurality of IGP routing domains;
a routing engine executed by the processor configured to output a routing message that conforms to an exterior gateway protocol (EGP),
wherein the routing engine constructs the routing message to include EGP reachability information that encodes IGP link state information to specify the path across the plurality of IGP routing domains, and
wherein the EGP reachability information encodes the path within the IGP link state information as a sequence of IGP path segments associated with the plurality of IGP routing domains.

9. The network device of claim 8, wherein the IGP link state information encoded by the EGP reachability information specifies, for each of the IPG path segments, a corresponding MPLS label to be used for forwarding packets along the respective IGP path segment.

10. The network device of claim 8, wherein the EGP reachability information encodes the IGP path segments as a set of explicit route objects, each of the explicit route objects specifying a respective next hop along the path and a corresponding path segment identifier that defines the MPLS label to be used when forwarding the packets along the IGP path segment to a forwarding equivalence class (FEC) associated with a destination of the path.

11. The network device of claim 8, wherein EGP reachability information of the exterior gateway protocol is extended to contain fields to specify IGP link state encodings for the following new segment routing identifiers: IGP prefix segment identifiers (SIDs), IGP-Adjacency SIDs, IGP-LAN-Adjacency SIDs and Binding SIDs.

12. The network device of claim 8,
wherein the EGP reachability information encodes within a single type-length-value structure both a primary path and a backup path that span the IGP multiple routing domains, and
wherein the EGP reachability information encodes both the primary path and the backup path within the IGP link state information as a plurality of IGP path segments associated with the plurality of IGP routing domains.

13. The network device of claim 8, further comprising:
wherein the routing engine receives one or more inbound routing messages from routing devices associated with the IGP routing domains, each of the routing messages conforming to the exterior gateway protocol and including EGP reachability information that encodes IGP link state information specifying one or more existing IGP path segments internal to the plurality of IGP routing domains, each of the IGP path segments represented as a binding between a segment identifier and forwarding equivalence class (FEC) associated with a destination of the path;
constructing, with the network device, an aggregate link state database that represents internal topologies of the IGP routing domains in accordance with the IGP link state information;
determining the path across the plurality of IGP routing domains by selecting one or more of the current IGP path segments from the IGP link state information within the aggregate link state database; and
generating the routing message in accordance with the selected one or more IPG path segments.

14. The network device of claim 8, wherein the network device comprises one of a router, a path computation element and a software defined network (SDN) controller.

15. A non-transitory computer-readable medium comprising instructions that cause a processor to:
generate, with a network device external to the IGP routing domains, a routing message that conforms to an exterior gateway protocol (EGP) and includes EGP reachability information that encodes interior gateway protocol (IGP) link state information for the plurality of IGP routing domains, wherein the EGP reachability information encodes the path within the IGP link state information as a sequence of IGP path segments associated with the plurality of IGP routing domains; and
output, from the network device and in accordance with the EGP, the routing message to a plurality of routing devices, each of the routing devices being associated with a one of the IGP routing domains.

16. The non-transitory computer-readable medium of claim 15, wherein the IGP link state information encoded by the EGP reachability information specifies, for each of the IPG path segments, a corresponding MPLS label to be used for forwarding packets along the respective IGP path segment.

17. The non-transitory computer-readable medium of claim 16, wherein the EGP reachability information encodes the IGP path segments as a set of explicit route objects, each of the explicit route objects specifying a respective next hop along the path and a corresponding path segment identifier that defines the MPLS label to be used when forwarding the packets along the IGP path segment to a forwarding equivalence class (FEC) associated with a destination of the path.

18. The non-transitory computer-readable medium of claim 15, wherein EGP reachability information is extended to specify IGP link state encodings for the following new segment routing identifiers: IGP prefix segment identifiers (SIDs), IGP-Adjacency SIDs, IGP-LAN-Adjacency SIDs and Binding SIDs.

19. The non-transitory computer-readable medium of claim 15,
wherein the EGP reachability information encodes within a single type-length-value structure both a primary path and a backup path that span the IGP multiple routing domains, and
wherein the EGP reachability information encodes both the primary path and the backup path within the IGP link state information as a plurality of IGP path segments associated with the plurality of IGP routing domains.

20. The non-transitory computer-readable medium of claim 15, further comprising:
receive, with the network device, one or more inbound routing messages from the routing devices associated with the IGP routing domains, wherein each of the routing messages conform to the exterior gateway protocol and includes EGP reachability information that encodes IGP link state information for the IGP routing domains, wherein the EGP reachability information encodes within the IGP link state information one or more existing IGP path segments internal to the plurality of IGP routing domains, each of the IGP path segments represented as a binding between a segment identifier and an MPLS label;

construct, with the network device, an aggregate link state database that represents internal topologies of the IGP routing domains in accordance with the IGP link state information;

determine the path across the plurality of IGP routing domains by selecting one or more of the current IGP path segments from the IGP link state information within the aggregate link state database; and generate the routing message in accordance with the selected one or more IPG path segments.

* * * * *